(12) United States Patent
Davis et al.

(10) Patent No.: US 7,586,036 B2
(45) Date of Patent: Sep. 8, 2009

(54) WIRE BASKET PATHWAY SYSTEM

(75) Inventors: David R. Davis, Richton Park, IL (US);
Dennis J. Waszak, Wheaton, IL (US);
Stanley A. Brzezniak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 197 days.

(21) Appl. No.: 11/930,570

(22) Filed: Oct. 31, 2007

(65) Prior Publication Data
US 2009/0008515 A1    Jan. 8, 2009

Related U.S. Application Data

(62) Division of application No. 11/930,376, filed on Oct. 31, 2007, now Pat. No. 7,476,801.

(60) Provisional application No. 60/948,071, filed on Jul. 5, 2007.

(51) Int. Cl.
H02G 7/00 (2006.01)
(52) U.S. Cl. .......... 174/40 CC; 60/64; 60/135; 60/653; 60/481; 248/49; 211/119; 52/263
(58) Field of Classification Search .......... 174/47, 174/480, 481, 505, 135, 19, 68.1, 60, 64, 174/40 CC, 653, 74 R, 487; 248/49, 175; 403/329; 211/119; 108/108; 52/220.3, 220.5, 52/263, 126.4
See application file for complete search history.

(56) References Cited

U.S. PATENT DOCUMENTS

| | | | |
|---|---|---|---|
| 4,630,417 A * | 12/1986 | Collier | 52/263 |
| 5,322,132 A * | 6/1994 | Franks, Jr. | 174/41 |
| 5,477,649 A | 12/1995 | Bessert | |
| 5,531,410 A | 7/1996 | Simon | |
| 5,904,009 A * | 5/1999 | Huang | 52/126.6 |
| 5,927,658 A | 7/1999 | Gerster | |
| 5,953,870 A | 9/1999 | Jette | |
| 6,023,024 A | 2/2000 | Stjerneby | |
| 6,138,961 A | 10/2000 | Zweig | |
| 6,239,364 B1 | 5/2001 | Nickel | |
| 6,311,732 B1 | 11/2001 | Nickel | |
| 6,340,141 B1 | 1/2002 | Rinderer | |
| 6,347,493 B1 | 2/2002 | Jette | |
| 6,361,000 B1 | 3/2002 | Jette | |
| 6,427,400 B1 | 8/2002 | Greenblatt | |
| 6,449,912 B2 | 9/2002 | Jette | |
| 6,463,704 B1 | 10/2002 | Jette | |
| 6,547,192 B2 | 4/2003 | Rinderer et al. | |
| 6,590,154 B1 | 7/2003 | Badey et al. | |
| 6,637,165 B2 | 10/2003 | Jette | |
| 6,637,704 B2 | 10/2003 | Jette | |

(Continued)

Primary Examiner—Dhiru R Patel
(74) Attorney, Agent, or Firm—Robert A. McCann; Christopher S. Clancy

(57) ABSTRACT

A pedestal bracket assembly includes a support clamp and a support plate attached to the support clamp. The support clamp is capable of engagement with a vertical support member in a fixed manner. The support plate has an opening formed therein and is adapted for engagement with at least one wire basket. The opening is configured to receive the vertical support member. The support plate is also moveably connected to the support clamp such that the support plate is rotatable about the vertical support member. The pedestal bracket assembly also includes a plurality of retainer clips spaced apart from each other and releasably attached to the support plate.

30 Claims, 23 Drawing Sheets

U.S. PATENT DOCUMENTS

| | | |
|---|---|---|
| 6,672,022 B2 | 1/2004 | Simmons |
| 6,855,884 B2 | 2/2005 | Spagnoli et al. |
| 7,168,212 B2 | 1/2007 | Jette |
| 7,432,449 B2 * | 10/2008 | Kim ........................ 174/138 F |
| 2005/0040295 A1 | 2/2005 | Sinkoff |

* cited by examiner

WIRE BASKET PATHWAY SYSTEM

CROSS-REFERENCE TO RELATED APPLICATIONS

This application is a divisional of U.S. patent application Ser. No. 11/930,376, filed Oct. 31, 2007, which claims priority to U.S. provisional patent application Ser. No. 60/948,071 filed Jul. 5, 2007.

FIELD OF INVENTION

This invention relates generally to the positioning, support and protection of cables, and is particularly directed to wire basket arrangements for maintaining pathways of cables securely and safely in position in a raised floor system.

BACKGROUND OF THE INVENTION

The widespread use of electronic systems in business and industry has led to the requirement to route large numbers of cables throughout the work environment. Various types of cable tray assemblies are used as a support system for carrying these cables throughout various locations in buildings and other commercial structures.

Attempts to provide additional space to accommodate greater numbers of cables have led to the development of raised floor systems. Raised floor systems make use of the space between the structure's original floor and an upper floor disposed in a spaced manner above the original floor.

Cable tray assemblies are particularly adapted for positioning beneath the floor panels of the raised floor to contain and direct cables along their respective pathways. Cable tray assemblies are generally comprised of a large number of individual cable trays which are typically made of wire lengths welded together in a cage-like arrangement to provide a support surface for the cables.

One problem encountered in these prior art cable support systems is the presence of sharp edges in the cable tray assemblies which are capable of cutting the cable's outer protective sheathing. In addition, increasing the number of cables within the confined space of the raised floor system restricts access to cable pathways which is required for carrying out maintenance and repair functions. The ability to vary the horizontal and vertical positioning of cable pathways in a controlled manner for improving cooling air circulation, optimizing cable pathway spacing and providing additional cable pathways is also limited in existing cable support systems.

The present invention addresses the aforementioned limitations of the prior art by providing for the flexible vertical and lateral positioning of cable pathways in a raised floor system, as well as the elimination of sharp edges in, and an increase in the strength of, individual cable trays for accommodating larger numbers of cables.

SUMMARY OF THE INVENTION

The present invention relates to an improved arrangement for supporting grounding and connecting together plural wire frames in a cable tray system.

The present invention also relates to the safe and secure support of large numbers of cables in a raised floor system, while providing cable access for inspection and maintenance.

The present invention further relates to an improved arrangement for a cable pathway system which facilitates rerouting of the cables and the incorporation of additional cables.

The present invention relates still further to improved cable tray wire frames having substantially increased strength and rigidity.

BRIEF DESCRIPTION OF THE DRAWINGS

Certain embodiments of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

DETAILED DESCRIPTION OF THE PREFERRED EMBODIMENTS

Figure 1:
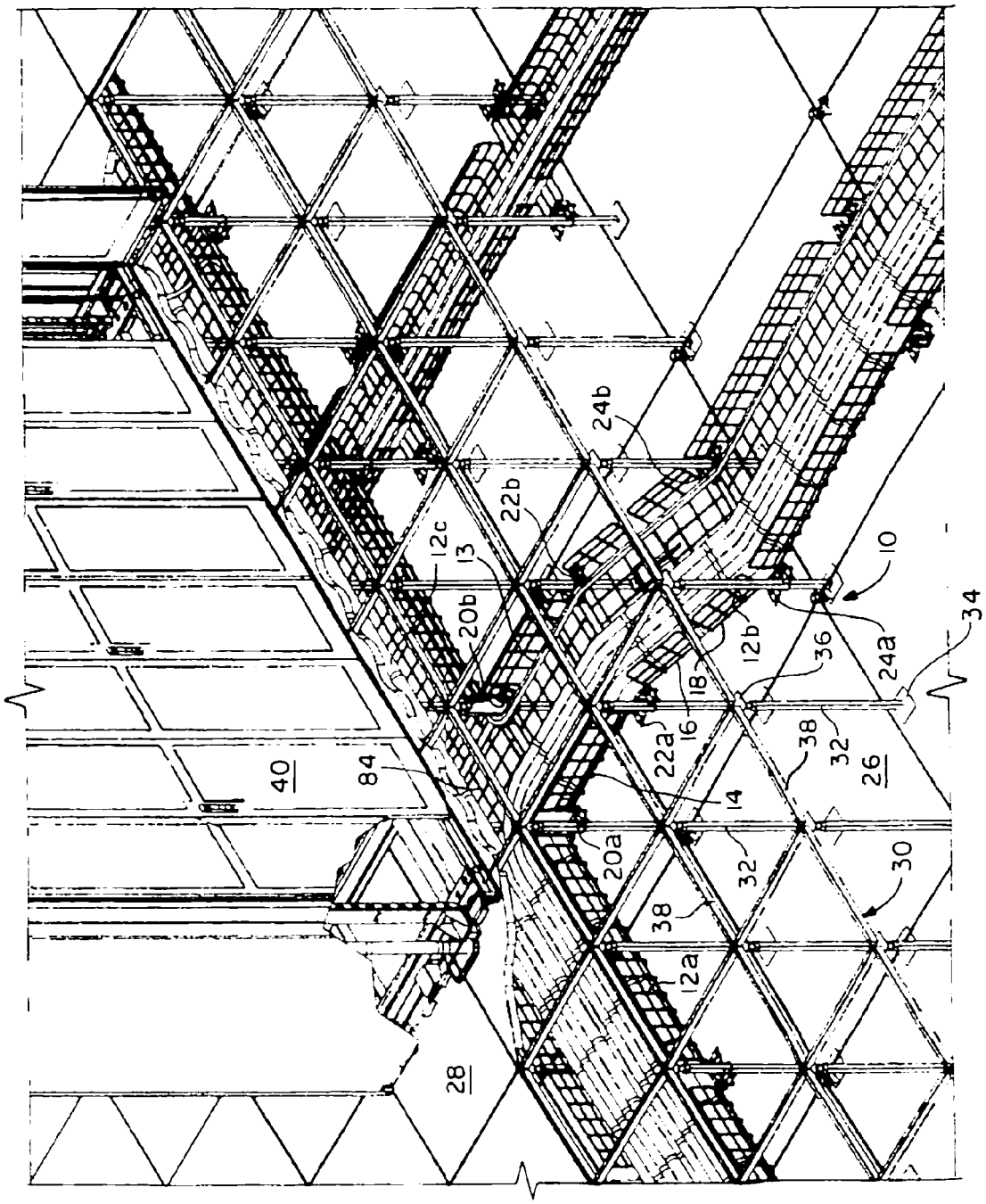
FIG. 1 is a perspective view of an improved wire basket pathway system in accordance with the principles of the present invention.

Referring to FIG. 1, there is shown a perspective view of an improved wire basket pathway system 10 in accordance with the principles of the present invention. The wire basket pathway system 10 provides for plural cable runs 12a, 12b and 12c, which are shown as an example, as the present invention is adapted for use with virtually any number of cable runs. Each of these three cable runs 12a, 12b and 12c includes plural cables carrying electronic signals. The wire basket pathway system 10 may also include one or more optical cables 13, as well as, possibly power cables which are not shown in the figure for simplicity.

The first, second and third cable runs 12a, 12b and 12c are disposed between a first lower floor 26 and a second raised floor 28. Electronic instrumentation is disposed on the second raised floor 28 and is typically enclosed in one or more cabinets 40.

The cable runs 12a, 12b and 12c are positioned on and supported by the inventive wire basket pathway system 10. The wire basket pathway system 10 includes plural wire baskets connected together and maintained in position by means of a support structure 30. Support structure 30 includes plural spaced vertical members 32 disposed on the first lower floor 26 and interconnected by means of plural upper horizontal members 38. Each of the vertical members 32 includes a respective lower plate 34 disposed on the first lower floor 26 and an upper plate 36 engaging and supporting plural upper horizontal members 38. This type of wire basket support structure 30 is conventional in structure and function. Typically, upper horizontal members 38 are also utilized to support floor panels of upper floor 28. As will be mentioned later below, the floor panels are currently at a United States standard of 24 inches by 24 inches and at a European standard of 600 mm by 600 mm.

The wire basket pathway system 10 shown in FIG. 1 includes a large number of wire baskets, but only three wire baskets 14, 16 and 18 will be discussed herein for simplicity. Each of the first, second and third wire baskets 14, 16 and 18 support the second cable run 12b, as well as, a portion of the optical cable run 13. Each of the first, second and third wire baskets 14, 16 and 18 is connected to and supported by two or more vertical members 32. Thus, the first wire basket 14 is connected to and supported by four vertical members 32 by means of four pedestal brackets 20a, 20b, 22a and 22b. Similarly, the second wire basket 16 is coupled to and supported by a pair of vertical members 32 by means of pedestal brackets 22a and 22b. Finally the third wire basket 18 is coupled to and supported by a pair of vertical members 32 by means of pedestal brackets 24a and 24b. In accordance with one aspect of the present invention, each of these pedestal brackets couple the wire basket or baskets to which it is connected to the building ground system via the vertical member on which the pedestal bracket is positioned (assuming the vertical member is otherwise grounded to the building ground). The second and third wire baskets 16, 18 are connected together in a telescoping manner to allow for a change in vertical height of the second cable run 12b in a manner which is described in detail below.

Figure 2:
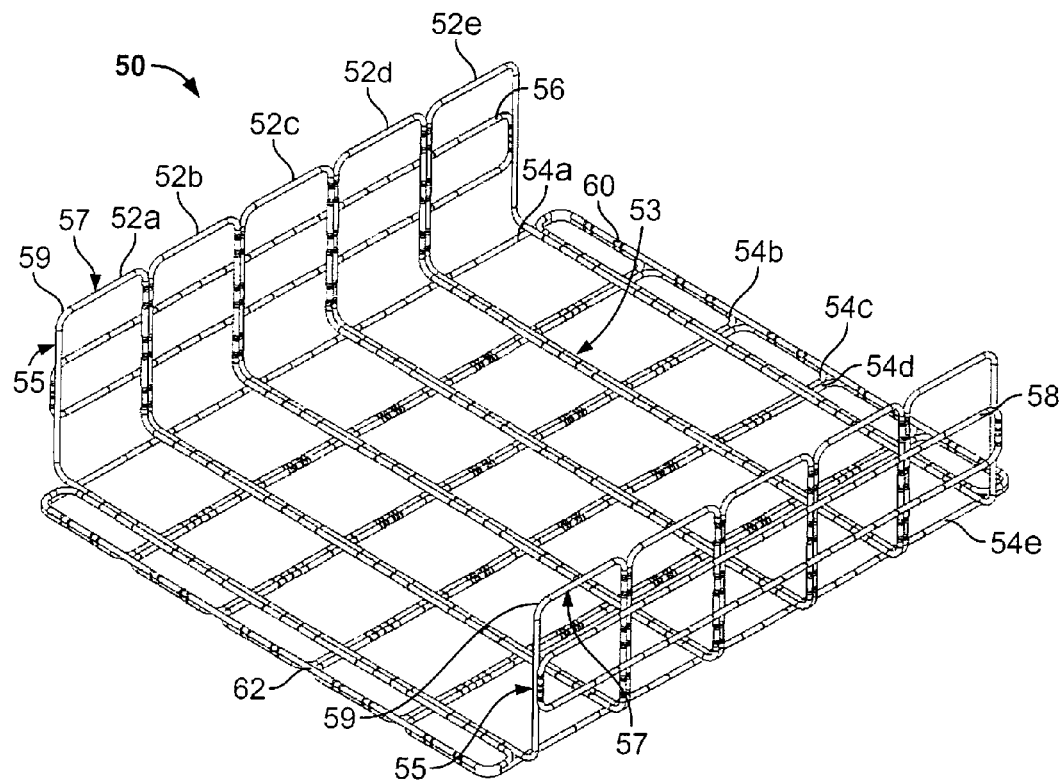
FIG. 2 is an upper perspective view of an improved wire basket for use in a cable pathway system in accordance with another embodiment of the present invention.

Referring to FIG. 2, there is shown an upper perspective of a reinforced wire basket 50 in accordance with one embodiment of the present invention. Reinforced wire basket 50 is comprised of plural connected wires and is designed to provide additional rigidity and strength for supporting and maintaining, in fixed position, large numbers of cables. The wires are preferably comprised of high pre-galvanized steel wire. However, the wires can be constructed of other metals such is stainless steel, cold-rolled steel, and the like. All 90° angles, as shown in this embodiment, in reinforced wire basket 50, as well as, in all other wire basket structures in accordance with the present invention disclosed herein, are formed by bending wires in a smooth curve and do not include any sharp edges which could damage a cable supported by the basket. The avoidance of sharp edges also prevents injuries to installers and technicians working with and around the system. Reinforced wire basket 50 is comprised of plural aligned U-shaped closed wire frames 52a-52e which are connected together in a side-by-side relationship forming a generally flat bottom 53 and opposed upraised end portions 55. This construction provides wire basket 50 with a generally overall U-shaped frame. As can be seen in FIG. 2, upraised end portion 55 comprises a closed section 57 without an end and in this example, two bend radii 59 are positioned one at each end of closed section 57. Reinforced wire basket 50 further includes plural aligned flat closed wire frames 54a-54e similarly, constructed in side-by-side relationship forming a generally flat structure. The lower portion of each of the U-shaped closed wire frames 52a-52e are placed in contact with and securely connected to each of the flat closed wire frames 54a-54e by means of resistance weldments at each wire intersection. Disposed on and securely attached to opposed vertical or upraised end portions 55 of the U-shaped closed wire frames 52a-52e by means of resistance weldments are first and second closed parallel wire frames 56 and 58. Opposed end portions of each of the flat closed wire frames 54a-54e extend beyond the respective end U-shaped closed wire frames 52a and 52e. Disposed on and securely attached by means of resistance weldments to each of the end extensions of the flat closed wire frames 54a-54e are third and fourth closed parallel wire frames 60 and 62. The double wire configuration of the connected U-shaped and flat closed wire frames as well as on its two opposed side and end portions substantially increases the strength and rigidity of the wire basket for supporting the weight of additional cables. The reinforced wire basket 50 is 21" wide by 6" high by 24" long.

Figure 3:
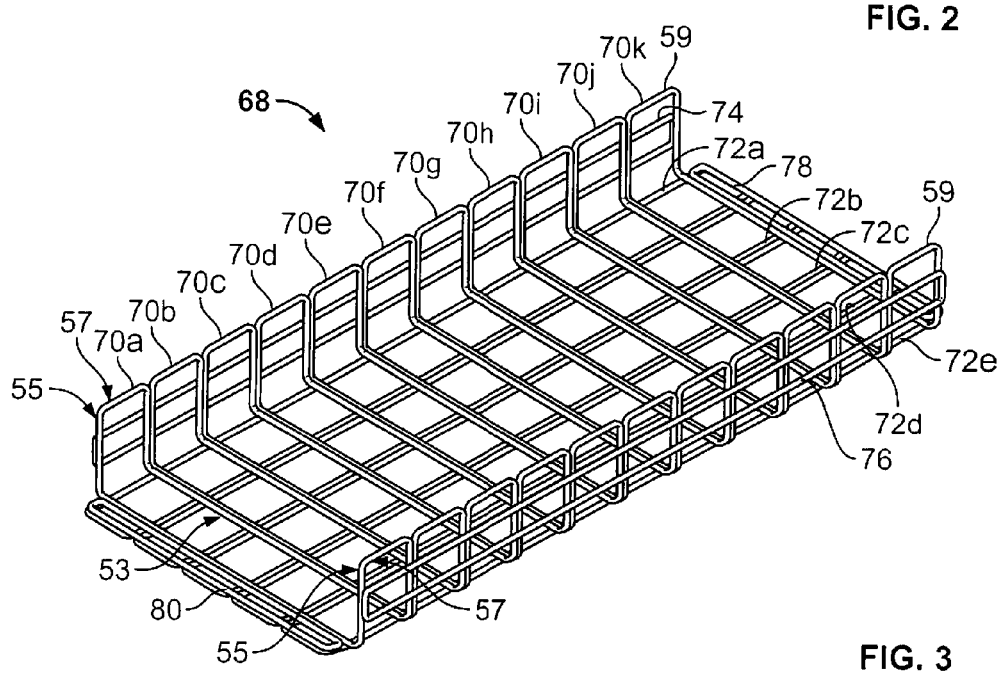
FIG. 3 is an upper perspective view of another embodiment of a wire basket for use in a cable pathway system in accordance with the present invention.

Shown in FIG. 3 is a larger reinforced wire basket 68 which is 21" wide by 6" high by 48" long. Reinforced wire basket 68 in accordance with another embodiment of the present invention has a larger number of U-shaped closed wire frames 70a-70k than that of reinforced wire basket 50 shown in FIG. 2. As in the previously described embodiment, reinforced wire basket 68 includes plural flat closed wire frames 72a-72e, first and second closed parallel wire frames 74 and 76 disposed on lateral portions of the U-shaped closed wire frames, and third and fourth closed parallel wire frames 78 and 80 disposed on opposed ends of the reinforced wire basket. The larger reinforced wire basket 68 shown in FIG. 3 would permit the use of fewer pedestal brackets in a wire basket pathway system in which it is incorporated. The inventive reinforced wire baskets disclosed herein are not limited to the specific dimensions discussed herein but may have a wide range of dimensions depending upon the dimensions of the cable pathways being supported.

Figure 4:
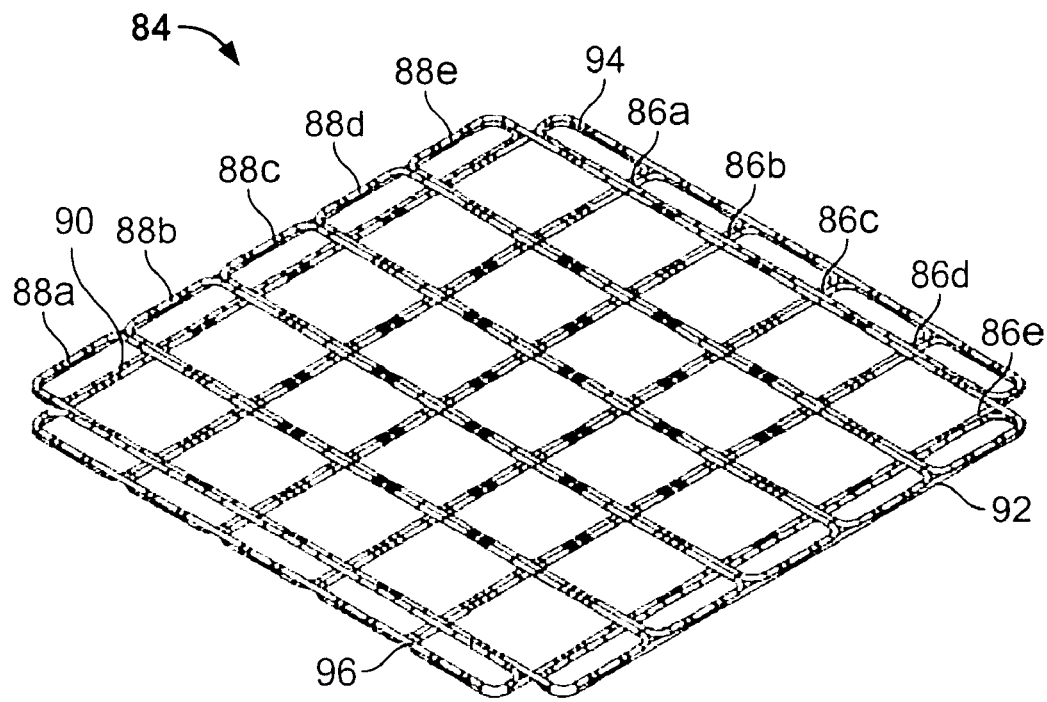
FIG. 4 is a perspective view of a wire basket intersection for use in a cable pathway system in accordance with another aspect of the present invention.

Referring to FIG. 4, there is shown a reinforced wire basket intersection 84 also in accordance with the present invention. Reinforced wire basket intersection 84 is also shown in the wire basket pathway system 10 of FIG. 1. Reinforced wire basket intersection 84 is installed and attached in the wire basket pathway system 10 in the same manner as the aforementioned wire baskets and allows for horizontal directional changes of the cables with a single component. Reinforced wire basket intersection 84 includes first plural closed parallel wire frames 86a-86e and second plural closed parallel wire frames 88a-88e which are aligned generally transverse to and are disposed in contact with one another. The ends of the first plural closed parallel wire frames 86a-86e extend beyond the width of the second plural closed parallel wire frames 88a-88e. Similarly, the ends of the second plural closed parallel wire frames 88a-88e extend beyond the width of the first plural closed parallel wire frames 86a-86e. First and second closed parallel wire frames 90 and 92 are disposed on and attached to opposed ends of the second plural closed parallel wire frames 88a-88e. Similarly, third and fourth closed parallel wire frames 94 and 96 are disposed upon and attached to opposed ends of the first plural closed parallel wire frames 86a-86e. Each wire frame is securely attached to all other wire frames with which it is in contact by means of resistance weldments. Providing a resistance weldment at each intersection of the various wire frames substantially increases the strength and rigidity of the reinforced wire basket intersection 84.

Figure 5:
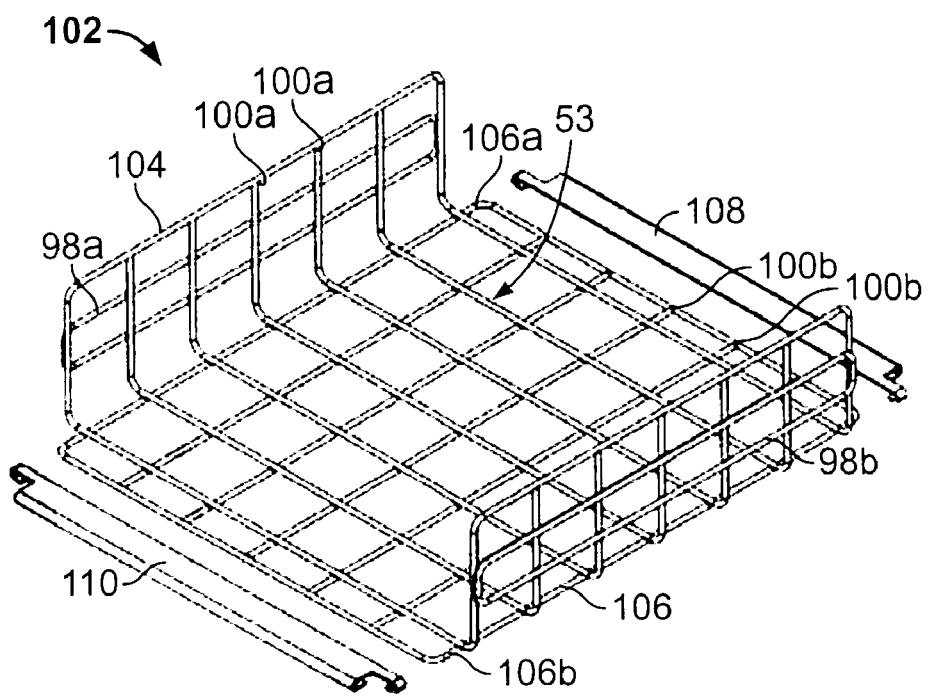
FIG. 5 is a partially exploded perspective view of a reinforced wire basket in accordance with another aspect of the present invention.
Figure 6:
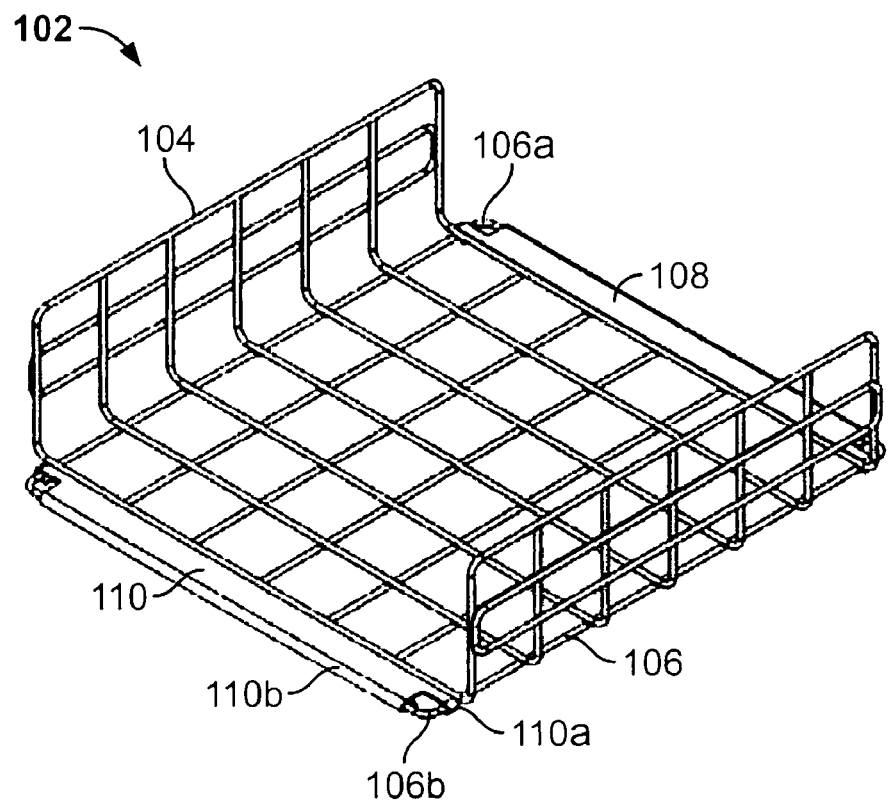
FIG. 6 is an upper perspective view of the reinforced wire basket of FIG. 5 shown assembled.

Referring to FIG. 5, there is shown an upper perspective view of another embodiment of a reinforced wire basket 102 in accordance with the present invention. Reinforced wire basket 102 includes an upper U-shaped frame assembly 104 and a lower planar frame assembly 106. The upper and lower frame assemblies 104, 106 are secured together by means of plural resistance weldments at their intersections. Disposed at opposed ends of the lower planar frame assembly 106 are first and second end reinforcing members 108 and 110, which are shown removed from the reinforced wire basket 102 in FIG. 5. FIG. 6 shows the first and second end reinforcing members 108, 110 attached to opposed ends of the reinforced wire basket's lower planar frame assembly 106a, b, as discussed in more detail below. First and second closed parallel wire frames 98a and 98b are attached to respective opposed ends of the upper U-shaped frame assembly 104 by means of weldments. Similarly plural T-welds such as at locations 100a and 100b securely connect inner wires to the outer peripheral wires of upper and lower frame assemblies 104 and 106. The first and second end reinforcing members 108, 110 are preferably comprised of pre-galvanized steel: however, other metals such as stainless steel, cold-rolled steel, and the like can be employed.

Figure 7:
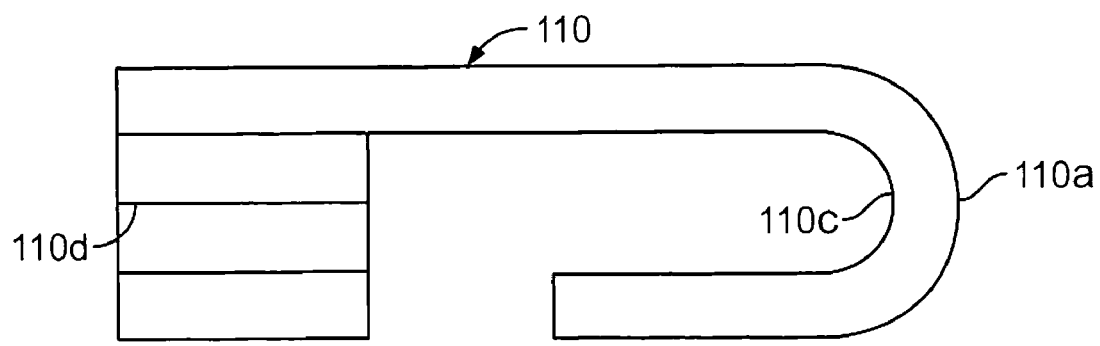
FIG. 7 is a sectional view of an end portion of a reinforcing member incorporated in the wire basket shown in FIG. 6.

Referring also to FIG. 7, there is shown a sectional view of an end portion of the second end reinforcing member 110. The second end reinforcing member 110 includes opposed lateral curvilinear end portions 110a and an aft end curvilinear portion 110b extending substantially the entire length of the reinforcing member as shown in FIG. 6. The first curvilinear end portion 110a forms a first inner recessed portion 110c in the end of the second end reinforcing member 110. The second curvilinear aft portion 110b forms a second inner recessed portion 110d extending substantially the length of the second end reinforcing member 110. The first and second inner recessed portions 110c and 110d are adapted for receiving end portions of the lower planar frame assembly 106 in a tight fitting manner so that the first and second end reinforcing members 108 and 110 are securely maintained in position on reinforced wire basket 102.

Figure 8:
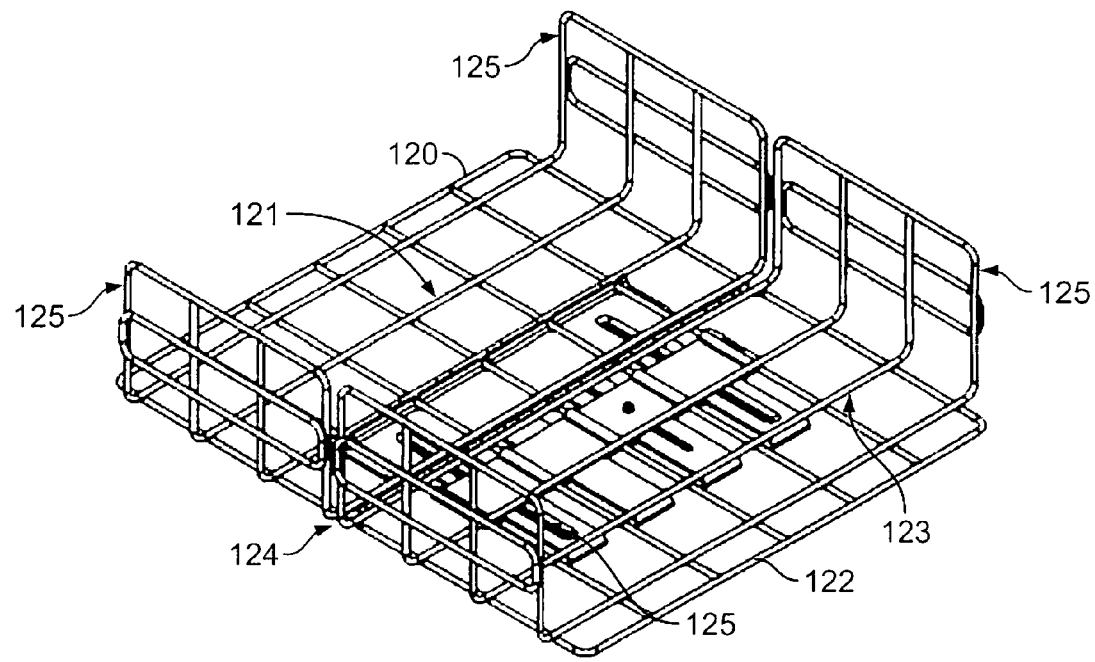
FIG. 8 is an upper perspective view of a pair of wire baskets connected together in a telescoping manner in accordance with another aspect of the present invention.
Figure 9:
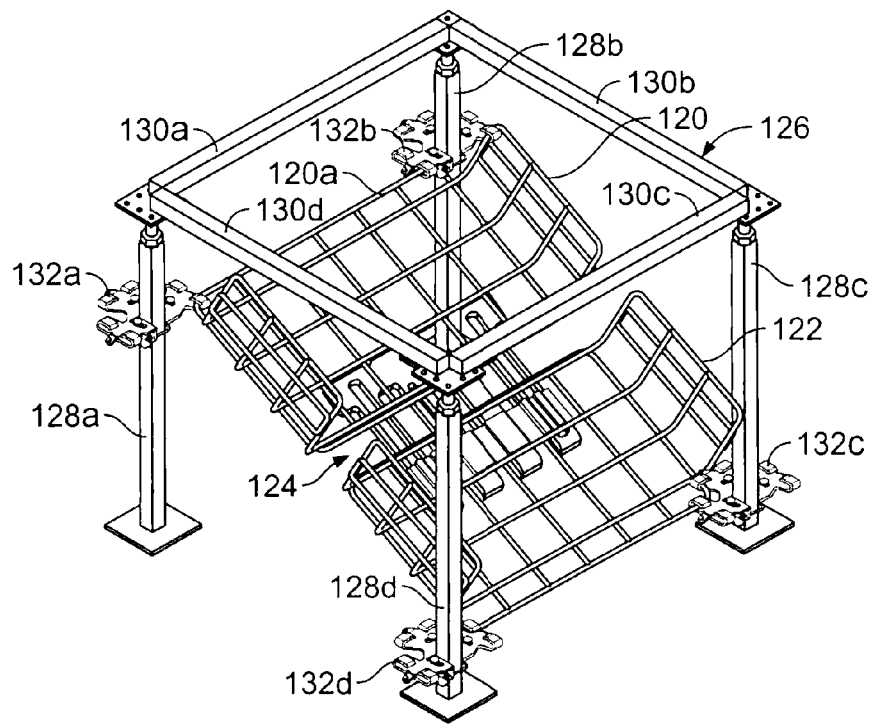
FIG. 9 is a perspective view of the telescopically coupled pair of wire baskets of FIG. 8 shown suspended from a support structure.
Figure 10:
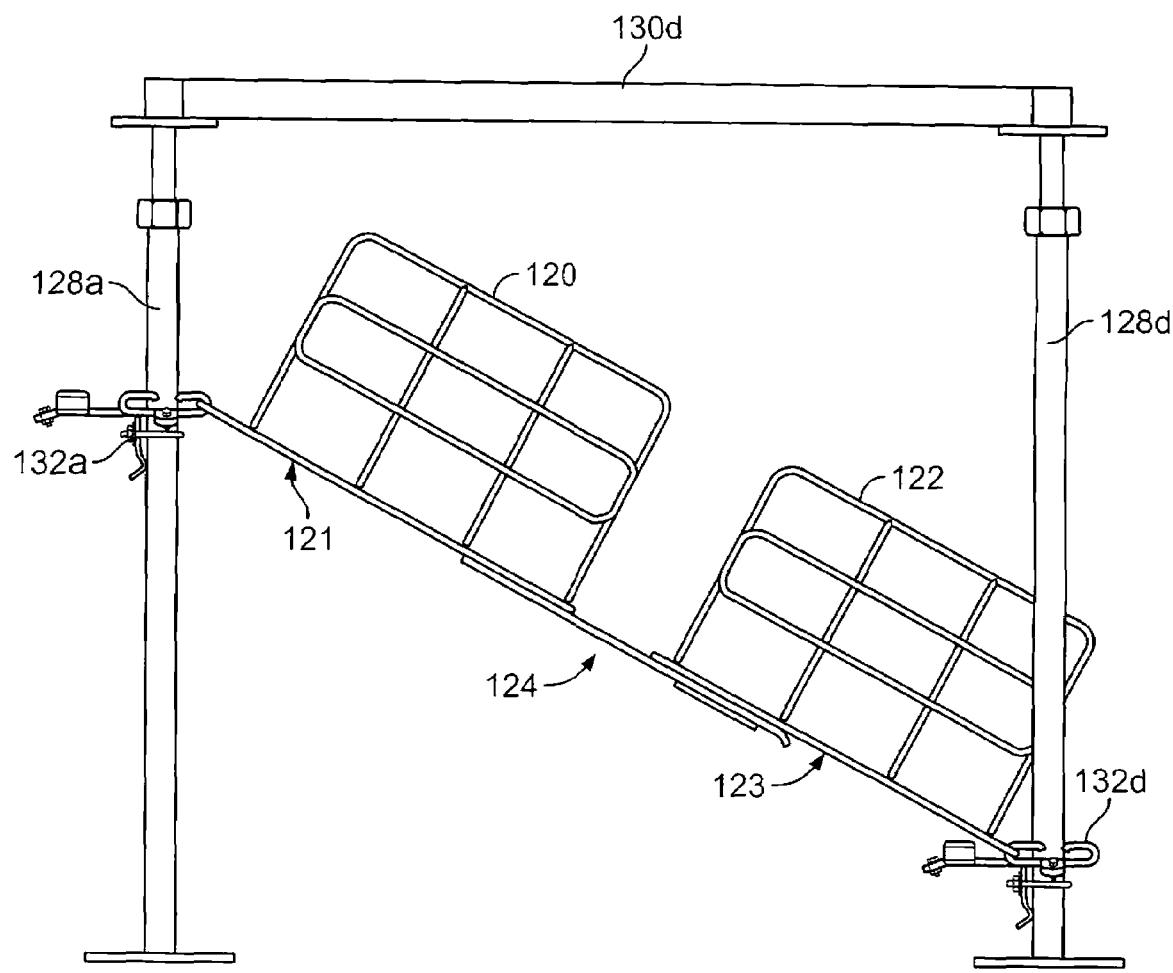
FIG. 10 is a side elevation view of the telescopically coupled pair of wire baskets shown in FIG. 9 extending over a large height change.
Figure 11:
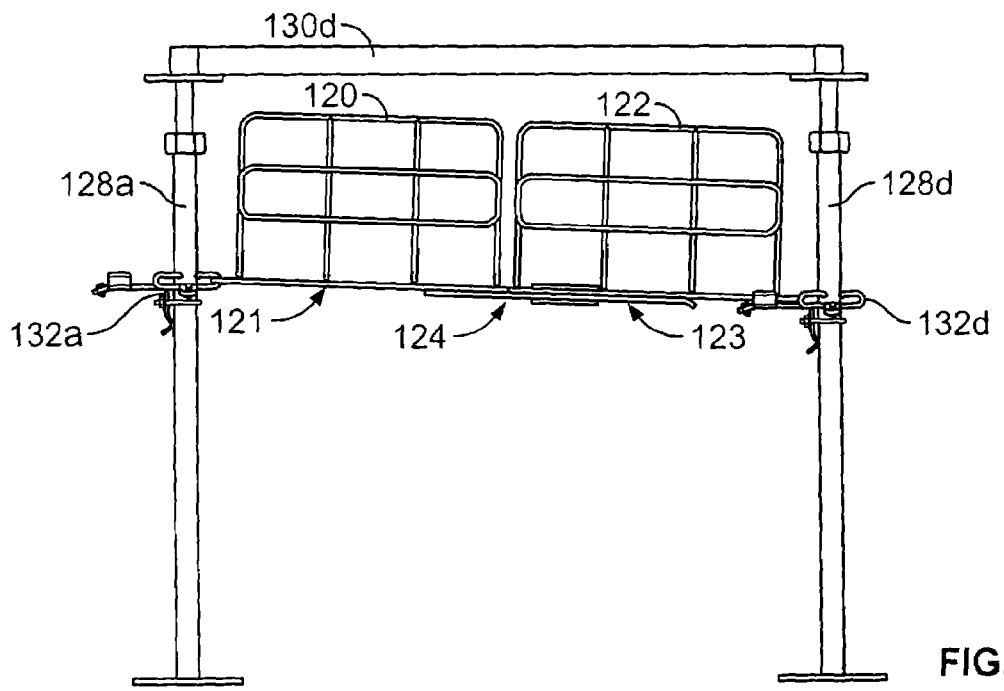
FIG. 11 is a side elevation view of the telescopically coupled pair of wire baskets shown in FIG. 9 extending over a small height change.

Referring to FIG. 8, there is shown first and second wire basket sections 120 and 122 coupled together by adjustable coupling assembly 124 in accordance with another embodiment of the present invention. The telescoping wire basket arrangement shown in FIG. 8 is also illustrated in FIG. 9, where the first and second wire basket sections 120, 122 are shown connected to and maintained in position by utilization of a support structure 126. Support structure 126 includes first through fourth vertical support members 128a-128d and first through fourth horizontal support members 130a-130d. One end portion of the first wire basket 120 is coupled to the first and second vertical support members 128a and 128b by use of pedestal brackets 132a and 132b, respectively. Similarly, one end of the second wire basket 122 is connected to the third and fourth vertical support members 128c and 128d by use of pedestal brackets 132c and 132d, respectively. The adjustable coupling assembly 124 allows the first and second wire basket sections 120, 122 to be either moved together in closely spaced relation or to be moved apart in an extended configuration. The extended configuration is shown in the side elevation view of FIG. 10, while the retracted configuration is shown in the side elevation view of FIG. 11. By adjusting the spacing between the first and second wire basket sections 120, 122, the vertical height change between the two wire baskets, and plural cables disposed thereon, may be adjusted in a continuous manner over a wide range of height differences, as desired. For example, for a minimal height change such as 1", the first and second wire basket sections 120, 122 are arranged in closely spaced relation as shown in FIG. 11. To accommodate a height change of 12", the first and second wire basket sections 120, 122 are arranged in the fully extended configuration as shown in FIG. 10. A maximum height differential of 12" is possible with a horizontal spacing of 24" between adjacent vertical support members 128a and 128d. Each floor tile is typically a 24"×24" square.

Figure 12:
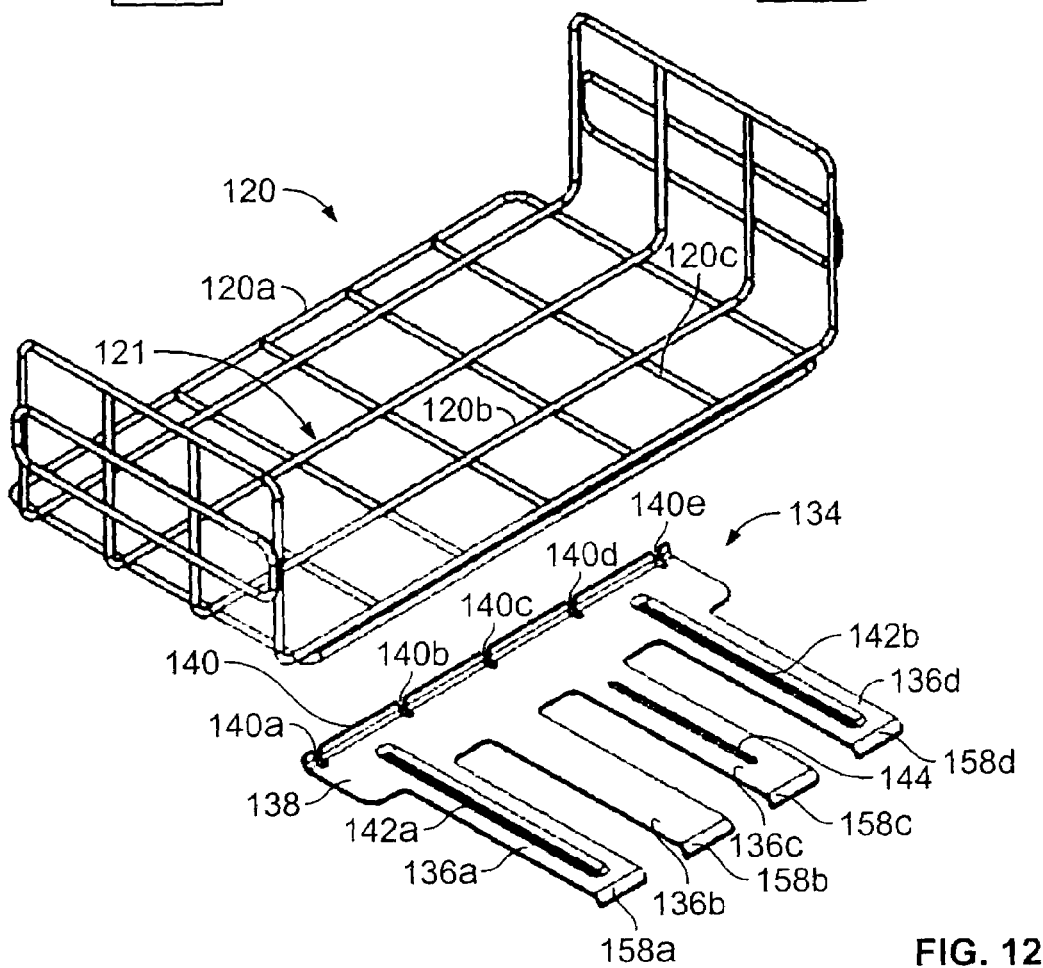
FIGS. 12 and 13 are upper perspective views of a first of the wire baskets shown in FIG. 8 illustrating a first telescoping member respectively detached from and attached to the wire basket.
Figure 13:
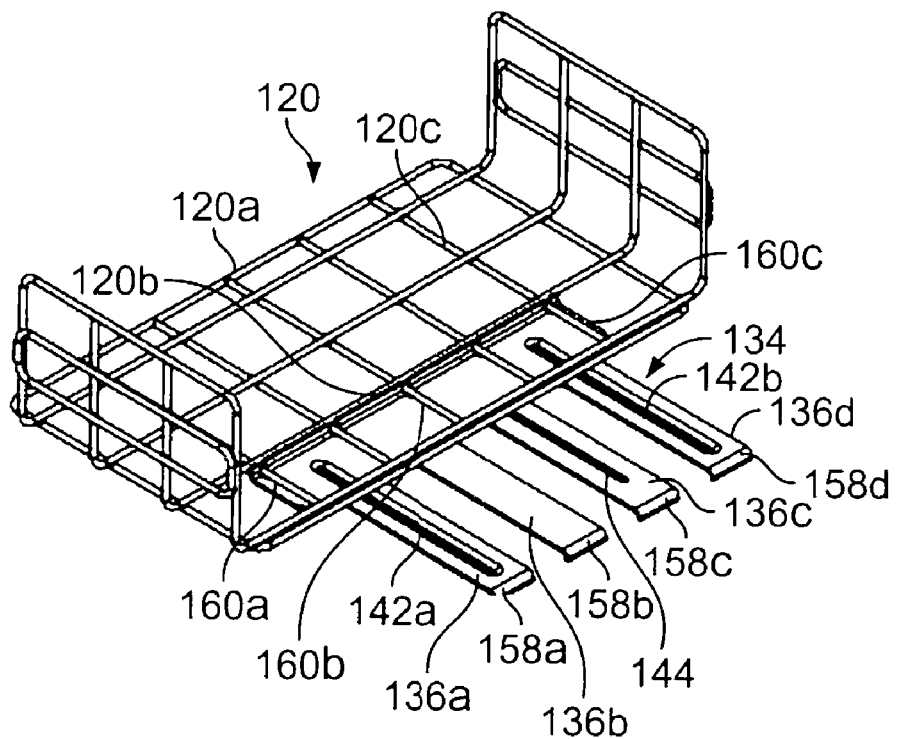

Referring to FIG. 12, there is shown a perspective view of the first wire basket 120 which includes an extended portion 120a extending substantially across its width. The first and second wire basket sections 120, 122 are identical in size and configuration. Each basket section 120, 122 is similarly constructed to wire basket 50, described above. Each section 120, 122 comprises a flat bottom portion 121 and 123 respectively, and opposing upraised end portions 125, wherein each section 120, 122 takes on a generally U-shaped overall frame configuration. Also shown in FIG. 12 is a first telescoping member 134 which is adapted for secure attachment to the first wire basket 120 as shown in FIG. 13. First telescoping member 134 is in the form of a single piece of high-strength metal and includes a body portion 138 and four elongated linear portions 136a-136d extending laterally from the body portion 138. The four elongated linear portions 136a-136d are arranged in a spaced manner along the length of the body portion 138. The two outer elongated linear portions 136a and 136d are each provided with a respective reinforcing rib 142a and 142b. The third elongated linear portion 136c is provided with an elongated, linear clearance slot 144. While not shown, a linear clearance slot could also be formed on elongated linear portion 136b. Disposed on the end of each of the four elongated, linear portions 136a-136d is a respective stop tab 158a-158d. Similarly, disposed on the outer edge of body portion 138 is an angled edge 140 having plural, spaced recesses 140a-140e disposed along its length. With the first telescoping member 134 positioned in contact with the first wire basket section 120 as shown in FIG. 13, the first telescoping member is securely connected to the first wire basket by means of plural resistance weldments 160a, 160b and 160c. With the first telescoping member 134 thus attached to the first wire basket section 120, the angled edge 140 of the first telescoping member engages wire 120b of the first wire basket. In addition, each of the spaced recesses 140a-140e in the angled edge 140 is adapted to receive a respective wire in a lower portion of the first wire basket 120. For example, wire 120c of the first wire basket section 120 is disposed within recess 140e in the first telescoping member's angled edge 140.

Figure 14:
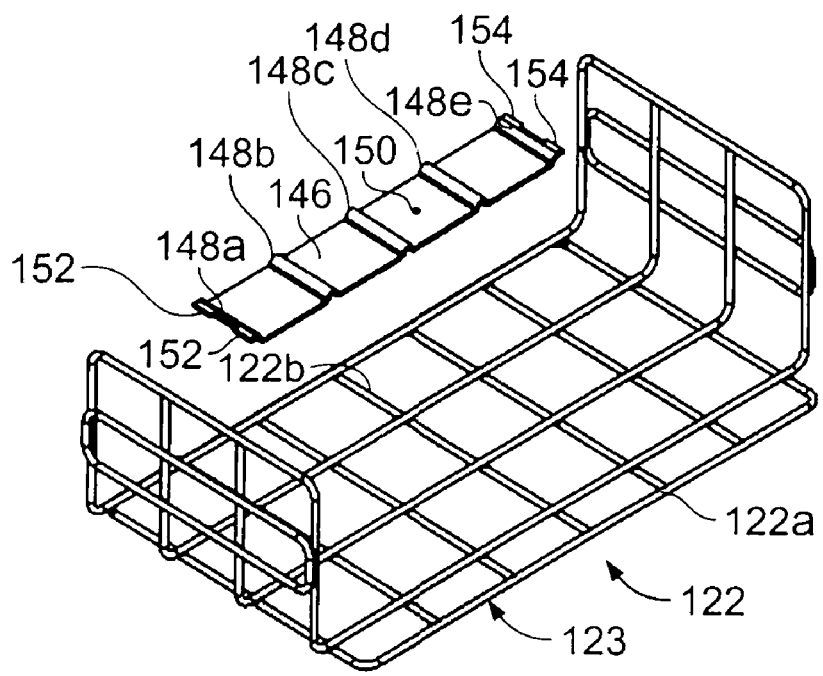
FIGS. 14 and 15 are upper perspective views of a second of the wire baskets shown in FIG. 8 illustrating a second telescoping member respectively detached from and attached to the wire basket.
Figure 15:
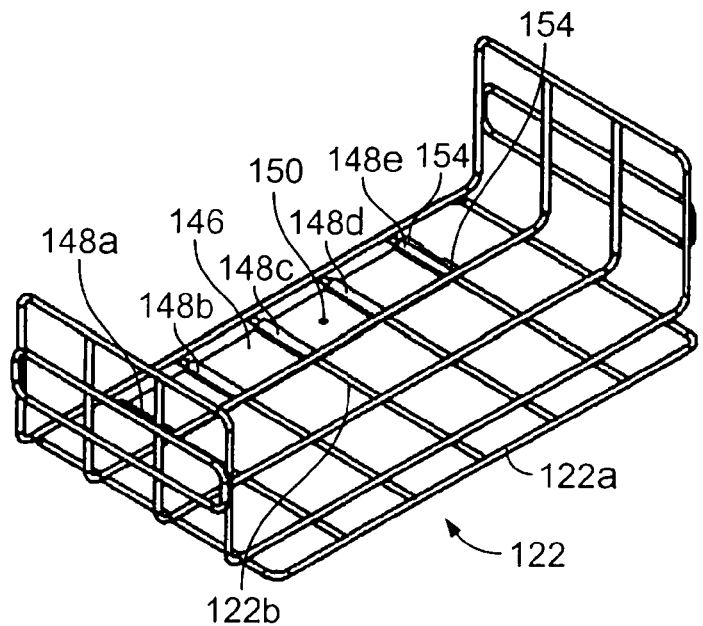

Referring to FIG. 14, there is shown an upper perspective view of the second wire basket section 122 including extension portion 122a and a second telescoping member 146. Second telescoping member 146 is shown positioned on second wire basket section 122 in FIG. 15. Second telescoping member 146 includes plural spaced upraised portions 148a-148e along its length. Disposed on the first upraised portion 148a are a pair of spaced tabs 152. Similarly, disposed on the fifth upraised portion 148e of the second telescoping member 146 are a second pair of spaced tabs 154. With the second telescoping member 146 disposed on the second wire basket section 122, a lower surface of each of the upraised portions 148a-184e is adapted to receive a respective wire of the second wire basket. For example, the lower surface of the third upraised portion 148c is adapted to receive wire 122b of the second wire basket section 122. Second telescoping member 146 further includes an aperture 150. Second telescoping member 146 is securely attached to the second wire basket by means of plural resistance weldments disposed between respective wires of the second wire basket and spaced recesses on the lower surface of the second telescoping member.

Figure 16:
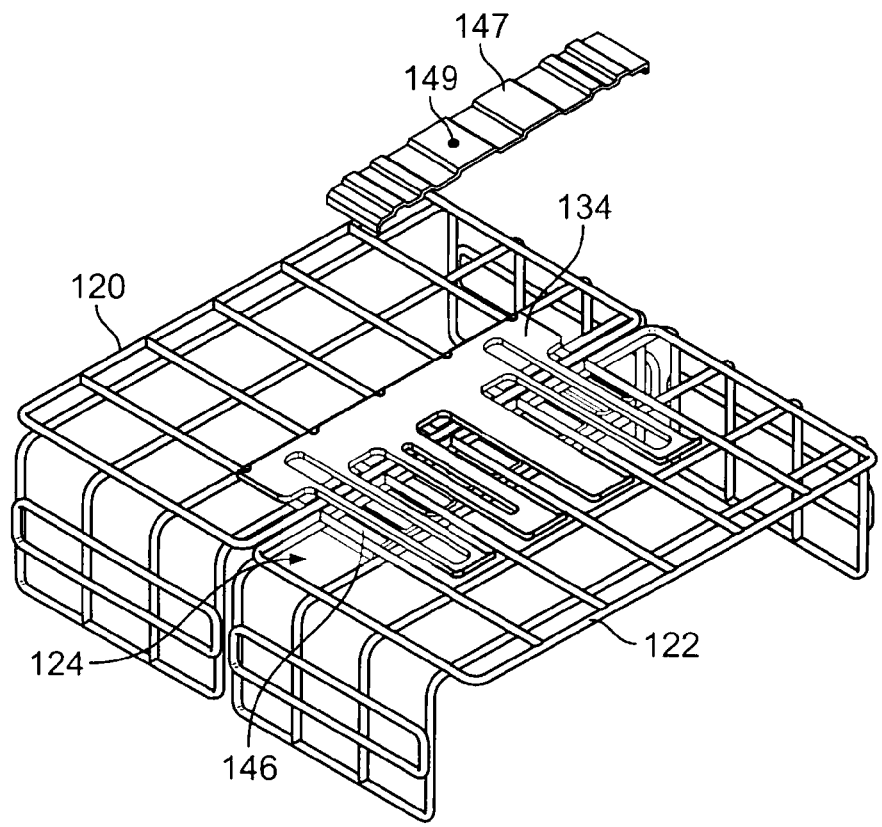
FIG. 16 is a lower perspective view of the telescopically coupled pair of wire baskets shown in FIG. 8 illustrating the second telescoping member prior to attachment to the telescoping arrangement.
Figure 17:
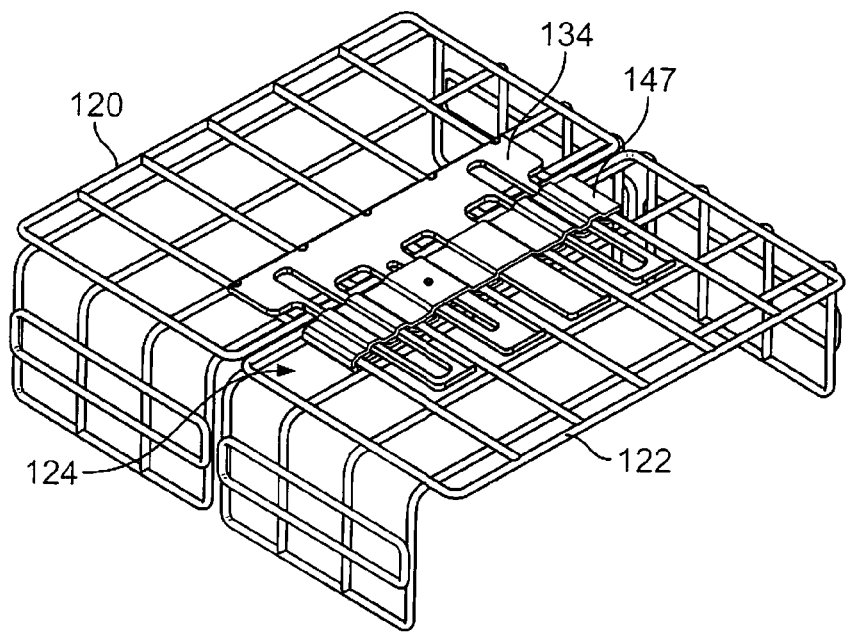
FIG. 17 is a lower perspective view of the telescopically coupled pair of wire baskets shown in FIG. 8.

With reference to FIG. 16, which is a lower perspective view of the first and second wire basket sections 120, 122, the combination is assembled by positioning the first telescoping member 134 which is attached to the first wire basket section 120 in an overlapping manner with respect to the second wire basket. The four elongated linear portions 136a-136d of the first telescoping member 134 are each positioned in contact with the second telescoping member 146 between adjacent upraised portions of the second telescoping member. A third telescoping member 147 having an aperture 149 is then positioned over the elongated linear portions 136a-136d of the first telescoping member 134 as shown in FIG. 17. A threaded fastener is inserted through apertures 150 and 149 in the second and third telescoping members 146 and 147, respectively, as well as through the elongated, linear clearance slot 144 in the first telescoping member 134, which are in mutual alignment. It is in this manner that the first and second wire basket sections 120, 122 are securely maintained in sliding engagement with each other to provide a telescoping feature for the two wire baskets and provide an electrical bond between wire basket sections 120, 122.

Figure 18:
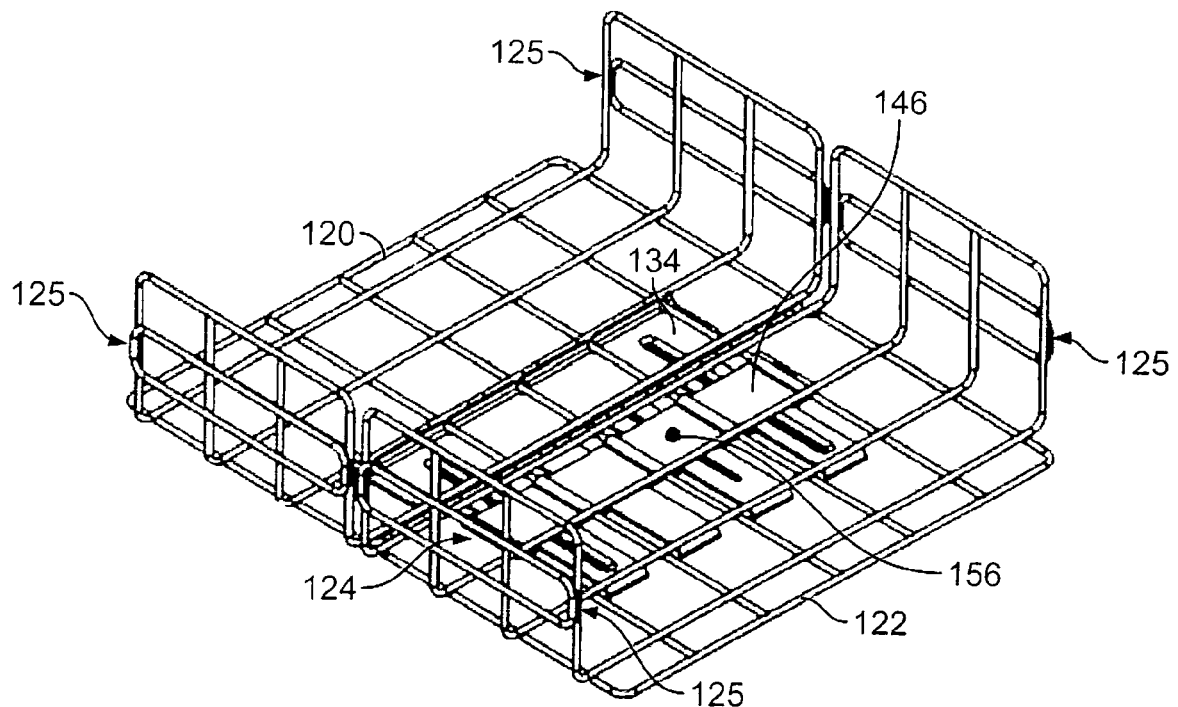
FIG. 18 is an upper perspective view of the pair of telescopically coupled wire baskets shown in FIG. 8 illustrating the two baskets in the non-extended configuration.
Figure 19:
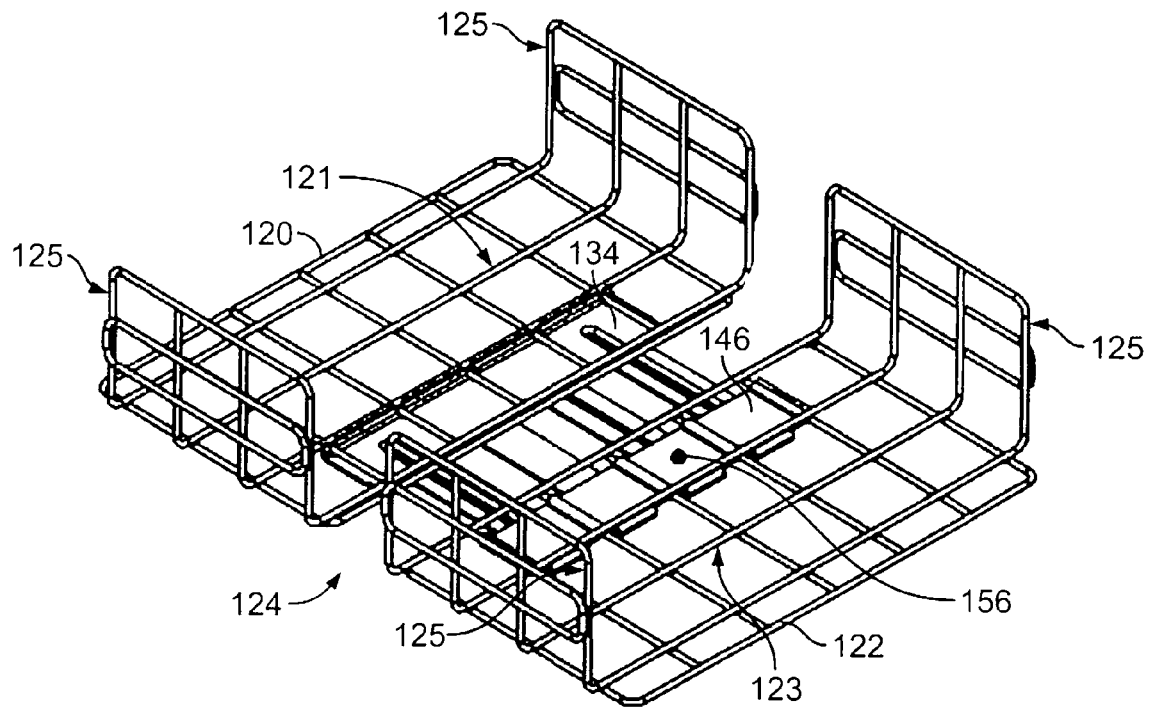
FIG. 19 is an upper perspective view of the pair of telescopically coupled wire baskets shown in FIG. 8 illustrating the two baskets in the fully-extended configuration.

FIG. 18 is a perspective view showing the first and second wire basket sections 120, 122 in the retracted, closely spaced position, while FIG. 19 is a perspective view showing the two wire baskets in the fully extended position. The threaded fastener 156 disposed within the aligned apertures 150, 149 of the second and third telescoping members 146, 147 and within the elongated, linear clearance slot 144 of the first telescoping member 134, in combination with the plural stop tabs 158a-158d also disposed on the first telescoping member, prevent separation of the first and second wire basket sections 120, 122. Once the proper spacing between the first and second wire basket sections 120, 122 is achieved, depending upon the required change in height between the two wire baskets, the threaded fastener 156 is tightened to maintain the required wire basket spacing.

Figure 20:
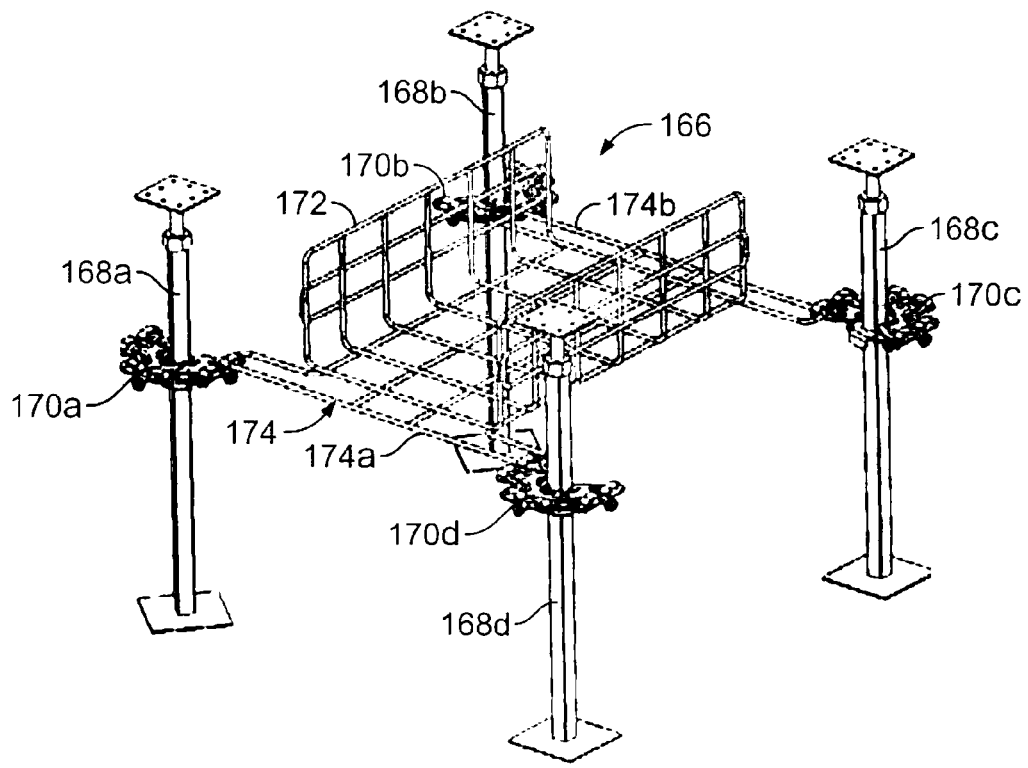
FIG. 20 is an upper perspective view of a centered wire basket attached to four vertical pedestal members, or support columns, in accordance with another embodiment of the present invention.

Referring to FIG. 20, there is shown an upper perspective view of a centered wire basket 166 without sharp edges and in accordance with another aspect of the present invention. Centered wire basket 166 is without sharp edges and is coupled to plural vertical pedestal members 168a-168d by means of plural pedestal brackets 170a-170d. Centered wire basket 166 includes a generally U-shaped upper frame member 172 connected to a lower frame member 174 by means of plural resistance weldments as previously described. Lower frame member 174 includes first and second extended end members 174a and 174b. The width of the wire basket's upper frame member 172 is less than the length of the extended end members 174a, 174b of the wire basket's lower frame member 174. The wire basket's upper frame member 172 is centered between the ends of its extended end members 174a, 174b and between the first and fourth pedestal members 168a, 168d and the second and third pedestal members 168b, 168c. The spaces between the sides of the wire basket's upper frame member 172 and the ends of the lower frame member's extended end members 174a and 174b provide access to the space below the centered wire basket 166 for maintenance or repair of system components located beneath the centered wire basket.

Figure 21:
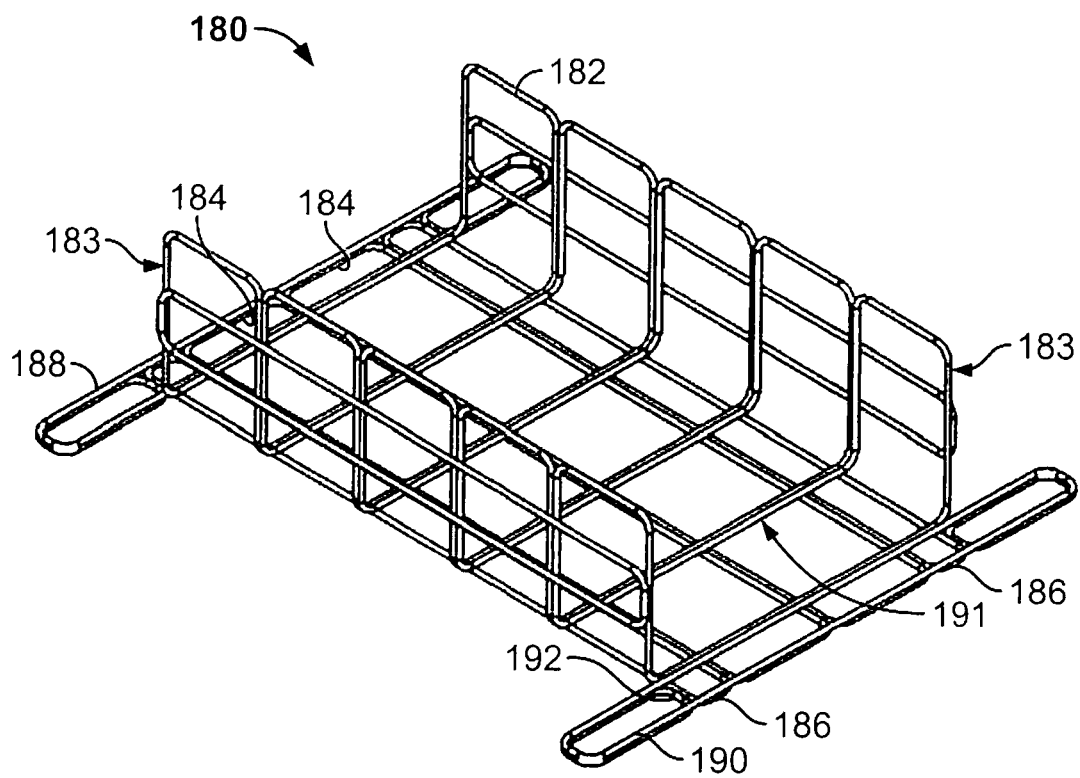
FIG. 21 is an upper perspective view of a reinforced centered wire basket in accordance with another embodiment of the present invention.

Referring to FIG. 21, there is shown another embodiment of a centered wire basket 180 in accordance with this aspect of the present invention. Centered wire basket 180 is also without any sharp edges and is similarly constructed as described above for wire basket 50 wherein plural U-shaped closed wire frames 182 with opposing upraised sections 183 are positioned in side-by-side relationship in mutual alignment and connected to a pair of inner flat closed wire frames 184 and a pair of outer flat closed wire frames 186. Plural wire frames 182 when connected form an overall U-shaped frame for wire basket 180. First and second end reinforcing members 188 and 190 are securely attached by use of resistance weldments (not shown for simplicity) to the end portions of the inner and outer flat closed wire frames 184 and 186. Extended end portions 188, 190 have distal ends that generally align with bottom 191 and extend away therefrom. A smaller flat closed wire frame 192 is disposed on opposed ends of each of the first and second end reinforcing members 188, 190 and is resistance welded to adjacent structural elements.

Figure 22:
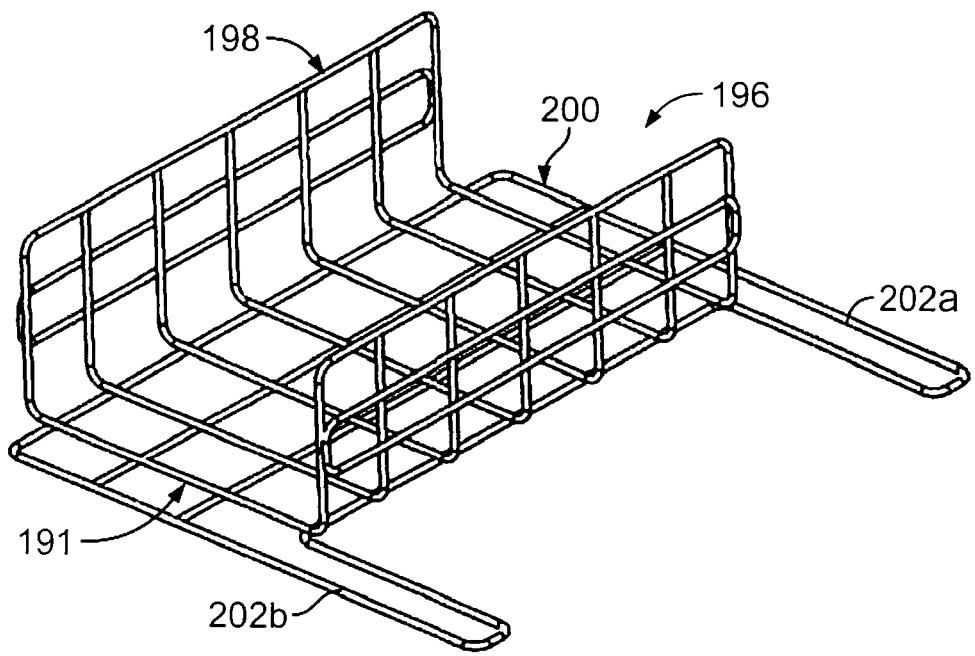
FIG. 22 is an upper perspective view of an off-center wire basket in accordance with another embodiment of the present invention.
Figure 23:
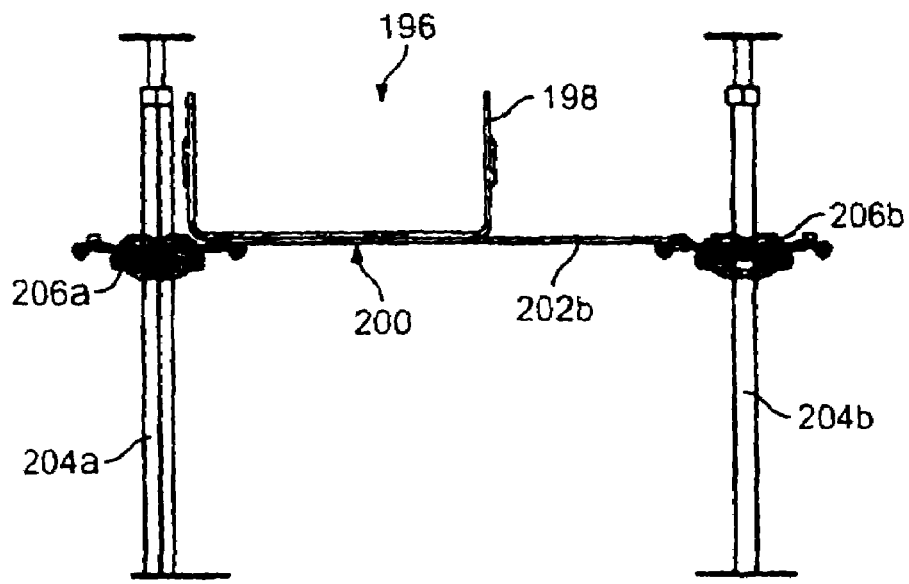
FIG. 23 is a front elevation view of the off-center wire basket of FIG. 22 shown attached to and supported by plural support members.

Referring to FIG. 22, there is shown an upper perspective view of an offset wire basket 196 in accordance with another embodiment of this aspect of the present invention. Offset wire basket 196 is shown in the front elevation view of FIG. 23 attached to first and second vertical supports 204a and 204b by means of first and second pedestal brackets 206a and 206b, respectively. Offset wire basket 196 includes a generally U-shaped upper frame 198 attached to a generally planar lower frame 200 by means of plural resistance weldments as previously described. Offset wire basket 196 also includes first and second extended end portions 202a and 202b. The offset wire basket's upper frame 198 is disposed on one end of each of the first and second extended end portions 202a, 202b to provide a space, or gap, between a lateral edge of the upper frame and the distal ends of the first and second extended end portions 202a, 202b. It is this space between a lateral portion of the offset wire basket's upper frame 198 and the distal ends of the lower frame's extended end portions, as shown for the case of extended end portion 202b in FIG. 23, which provides access for maintenance or repair of system components located below the offset wire basket 196.

Figure 24:
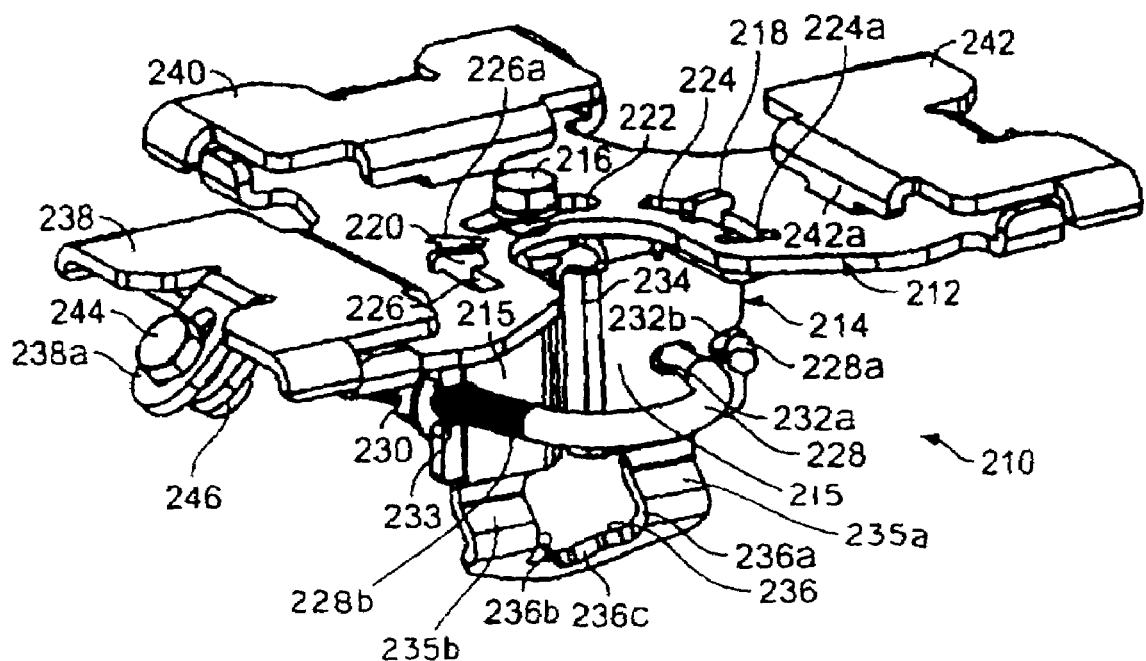
FIG. 24 is a perspective view of a pedestal bracket for attaching a wire basket to a support structure in accordance with another embodiment of the present invention.
Figure 25:
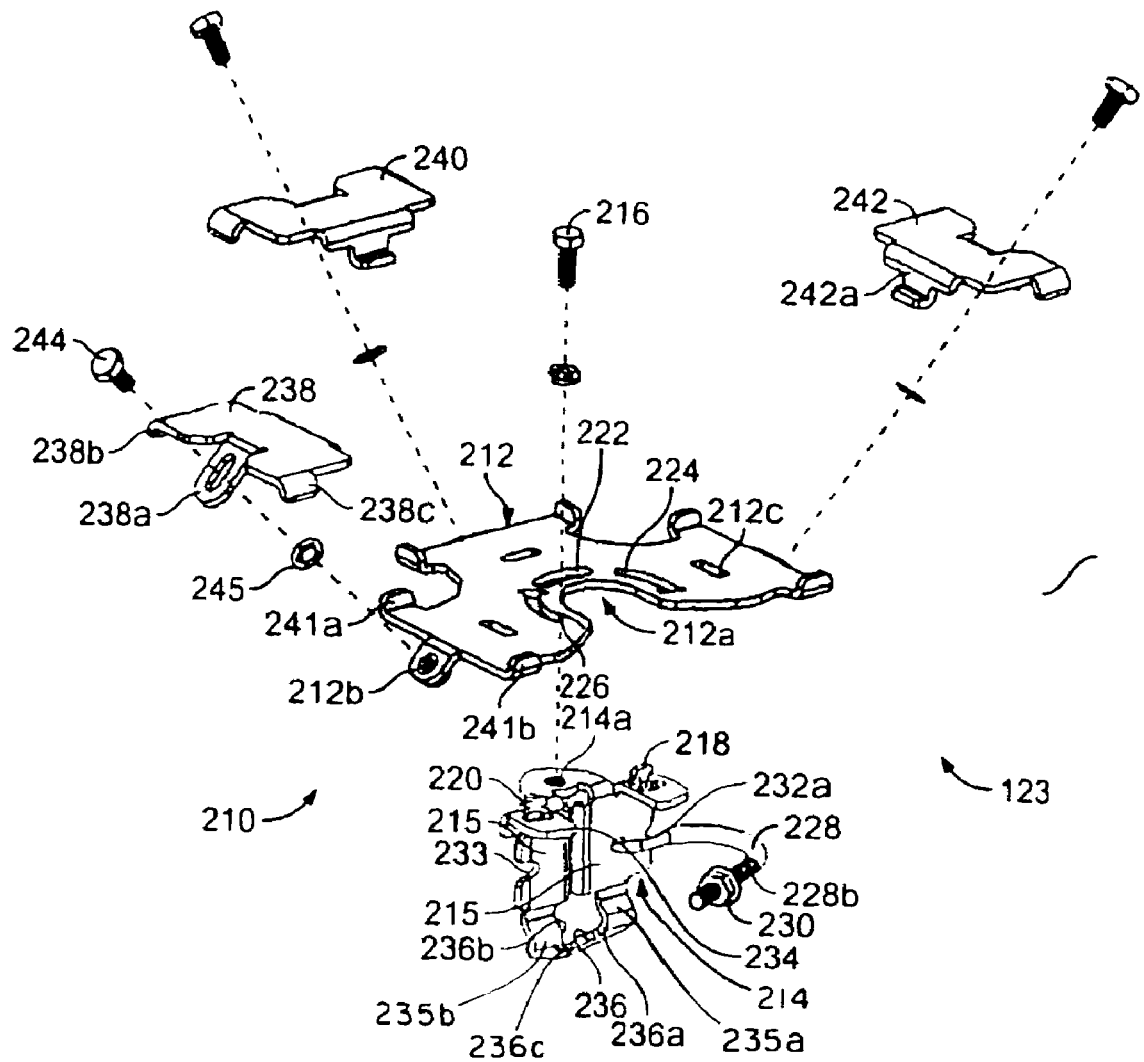
FIG. 25 is an exploded perspective view of the pedestal bracket shown in FIG. 24.

Referring to FIG. 24, there is shown a perspective view of a pedestal bracket 210 in accordance with another aspect of the present invention. An exploded perspective view of the inventive pedestal bracket 210 is shown in FIG. 25, while FIGS. 26-29 illustrate additional details of the inventive pedestal bracket.

Pedestal bracket 210 includes an upper support plate 212 and a lower support clamp assembly 214. Support plate 212 is securely attached to support clamp assembly 214 by use of a support plate locking screw 216 inserted through a first curvilinear elongated slot 222 in the support plate and into a threaded aperture 214a in an upper portion of the support clamp assembly 214. Support plate 212 and support clamp assembly 214 are further coupled together by means of first and second shoulder locking tabs 218 and 220. First shoulder locking tab 218 is inserted through a second curvilinear slot 224 through insert slot 224a in support plate 212, while second shoulder locking tab 220 is similarly inserted through a third curvilinear slot 226 within the support plate through insert slot 226a. An opening 212a is formed in support plate 212 for receiving a vertical support member. Attached to the upper surface of support plate 212 are three retainer clips 238, 240 and 242. Each retainer clip includes a respective inwardly directed angled tab, as shown for the case of the third retainer clip 242 having angled tab 242a. Angled tab 242a is adapted for insertion in slot 212c in support plate 212. Each retainer clip further includes an outwardly extending apertured tab, as shown for the first retainer clip 238 hashing apertured tab 238a. Each pair of angled and apertured tabs are disposed on opposed portions of a retainer clip and extended downwardly from the retainer clip. Each apertured tab 238a of a retainer clip is disposed in contact with an apertured mounting tab 212b attached to and extending from the support plate 212. A retainer clip screw 244 is inserted through the aligned apertures of the retainer clip's apertured tab 238a and an apertured mounting tab 212b attached to and extending from support plate 212. A connector 246 engages screw 244 for maintaining each retainer clip securely in position on the upper surface of the support plate 212. A screw retainer 245 is used to secure the screw 244 to the retainer clip 238 in an assembly. Each of the first, second and third retainer clips 238, 240 and 242 is adapted to engage and support at least one wire basket as described in detail below. In order to more securely maintain a wire basket on the pedestal clamp's support plate 212, each retainer clip is provided with first and second edge tabs 238b and 238c as shown for the first retainer clip 238 in FIG. 25. Disposed adjacent each retainer clip are upward extending tabs 241a and 241b on the pedestal clamp's support plate 212 as also shown in FIG. 25 for maintaining a wire basket in engagement with the pedestal bracket 210.

Attached to support clamp assembly 214 is a U-bolt clamp 228 in the form of a metal rod. U-bolt clamp 228 is adapted for securely connecting pedestal bracket 210 to a support member 248. U-bolt clamp 228 includes a first curvilinear end 228a and a second threaded end 228b. The first curvilinear end 228a of U-bolt clamp 228 is adapted for insertion through an aperture 232a as well as through a slot 232b within the support clamp assembly 214. The first curvilinear end 228a of U-bolt clamp 228 is capable of undergoing pivoting displacement about the portion of the support clamp 214 between its aperture 232a and slot 232b in the direction of arrow 252 in FIG. 26.

Figure 27:
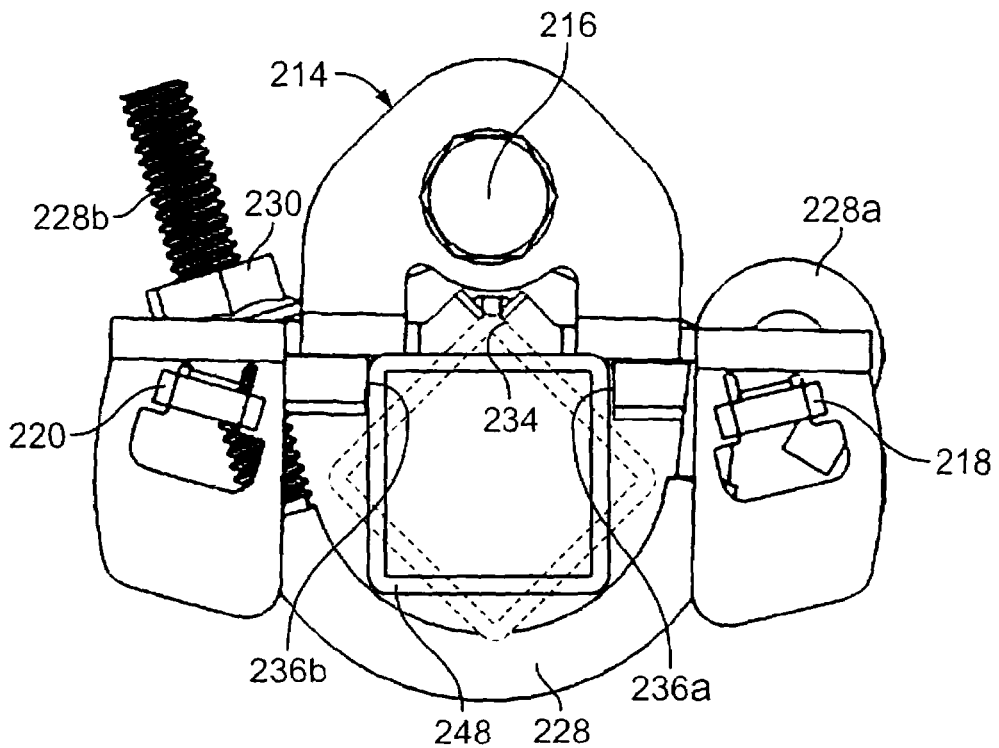
FIG. 27 is an top plan view of the support clamp portion of the inventive pedestal bracket illustrating the U-bolt clamp in the closed position.
Figure 28:
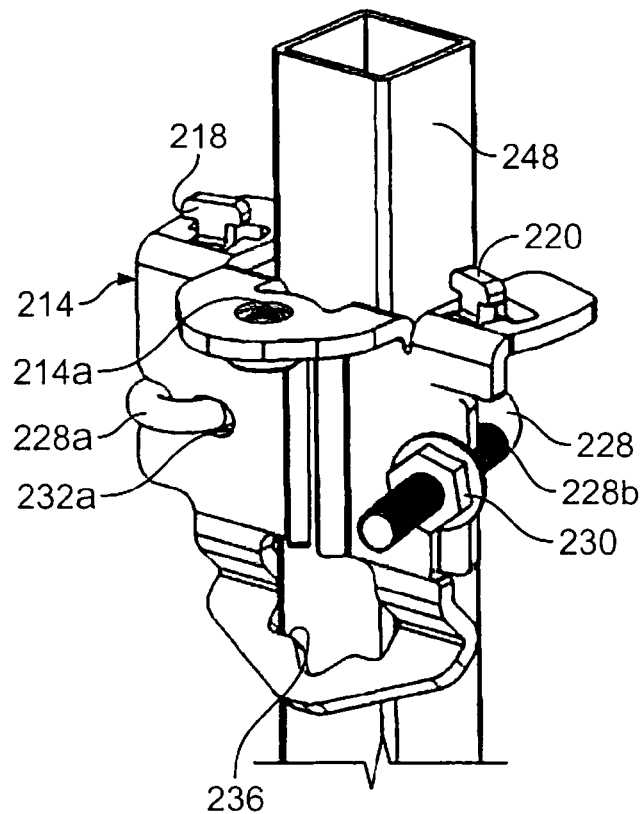
FIG. 28 is a perspective view of the support clamp portion of the inventive pedestal bracket attached to a vertical support member.

The U-bolt clamp 228 may, thus, be moved to a position in contact with vertical support member 248 (also referred to as 32 in earlier figures), as shown in FIG. 27. In this position, the threaded end 228b of U-bolt clamp 228 is disposed within a notched portion 233 in an outer edge of the support clamp 214. Tightening of a nut 230 disposed on the threaded end 228b of the U-bolt clamp 228 secures pedestal bracket 210 in fixed position on vertical support member 248.

Figure 26:
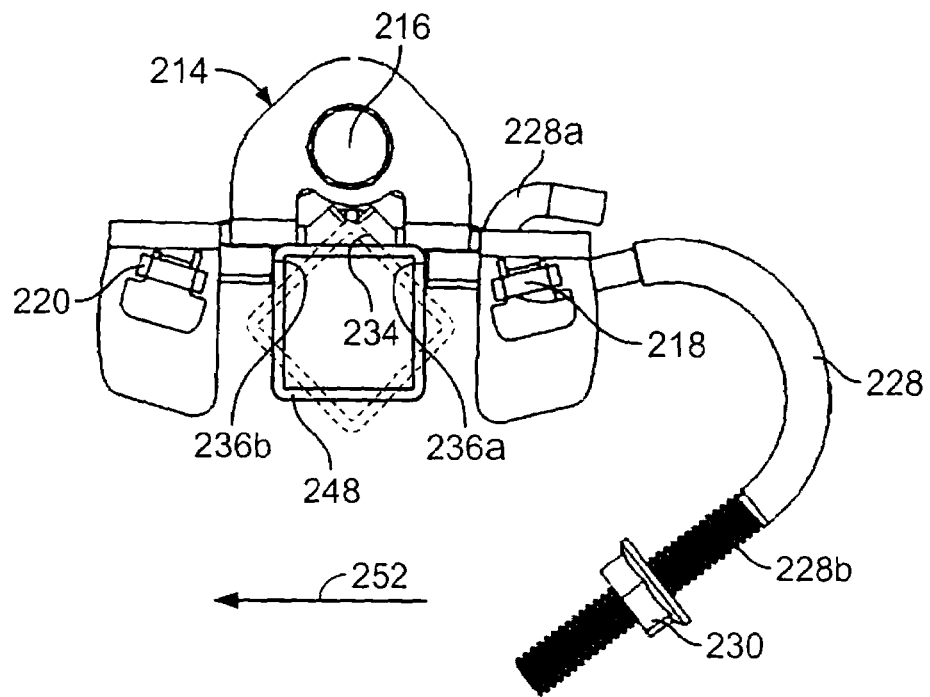
FIG. 26 is a top plan view of a support clamp portion of the inventive pedestal bracket illustrating its U-bolt clamp in the open position.
Figure 29:
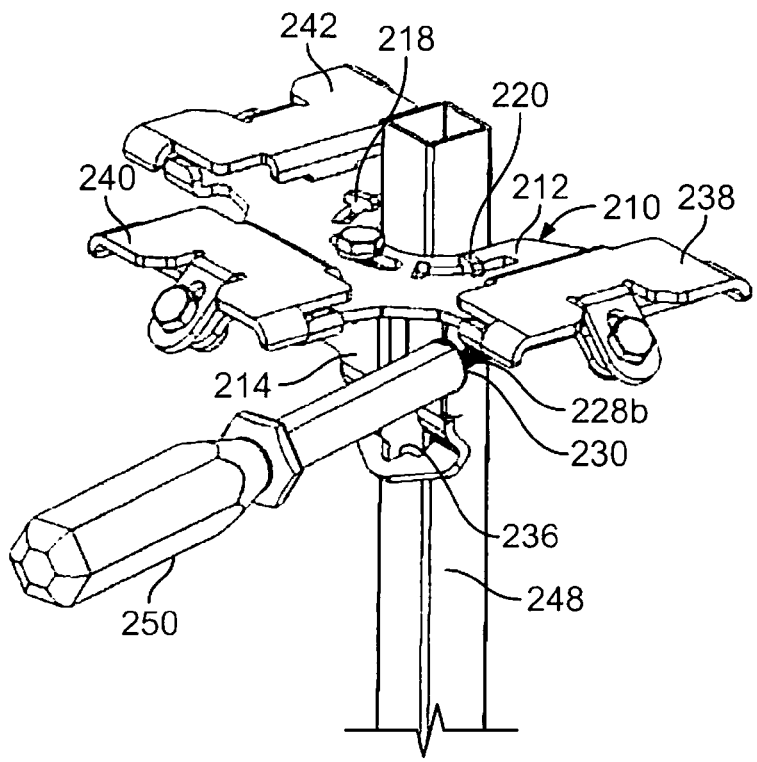
FIG. 29 is a perspective view of the inventive pedestal bracket attached to a vertical support member illustrating the manner in which the pedestal bracket's U-bolt clamp is tightened.

The support clamp assembly 214 of pedestal bracket 210 further includes a V-shaped recess 234 formed from wall 215 and adapted to engage an outer corner of a generally square, or rectangular, vertical support member 248 as shown in FIGS. 26 and 27, as well as a circular or round vertical support member, not shown. The V-shaped recess 234 and U-bolt clamp 228 maintain the support clamp 214 in secure position on vertical support 248. Support clamp assembly 214 further includes two tabs 235a and 235b, as seen in FIGS. 24 and 25, wherein form a pair of spaced, facing flat surfaces 236a and 236b for engaging opposed outer surfaces of vertical support member 248 as also shown in FIGS. 26 and 27. First and second facing flat surfaces 236a, 236b of support clamp assembly 214 in combination with U-bolt clamp 228 maintain the pedestal bracket 210 securely in fixed position on vertical support member 248. The lower end of the V-shaped recess 234 and the spaced, facing flat surfaces 236a and 236b form a portion of an aperture 236 in a lower portion of support clamp assembly 214. As shown in the various figures, the portion of the support clamp assembly 214 adjacent the lower aperture 236 therein is angled inwardly to increase the strength of this portion of the support clamp to provide increased resistance to rotation of the pedestal bracket 210 on vertical support member 248. As shown in FIG. 29, U-bolt clamp 228 of the support clamp assembly 214 is securely attached to the vertical support member 248 by tightening nut 230 around the threaded end portion 228*b* of the U-bolt clamp by means of a conventional tool such as a nut driver 250.

Figure 30:
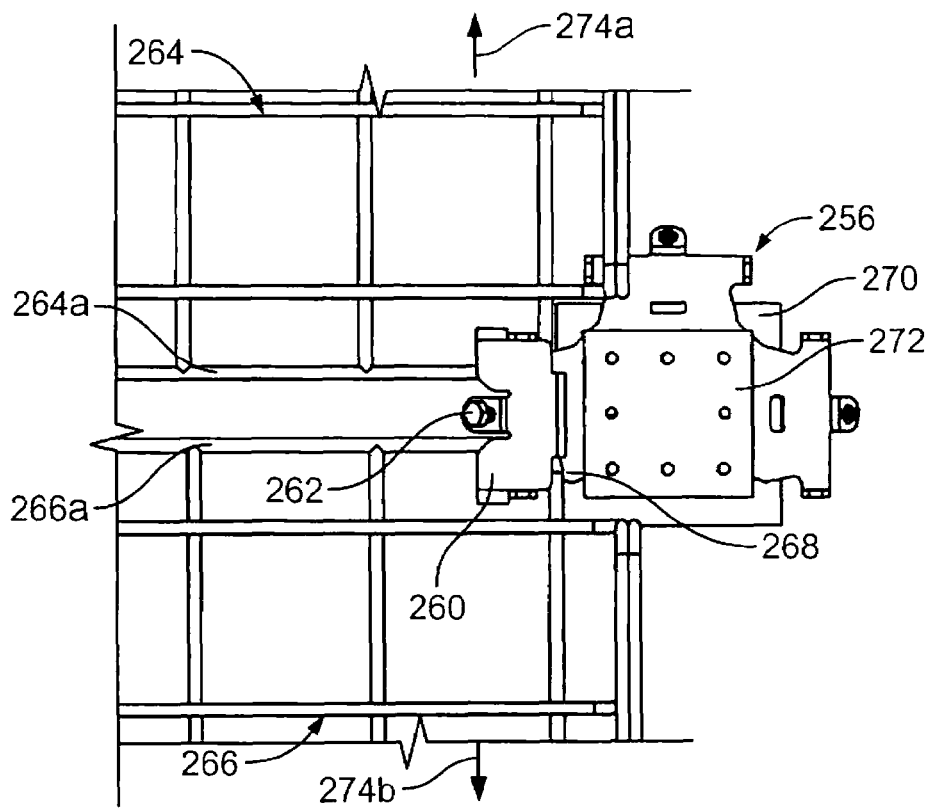
FIG. 30 is a top plan view of a pedestal bracket in accordance with the present invention attached to and supporting a pair of wire baskets.

Referring to FIG. 30, there is shown the manner in which a pedestal bracket 256 engages and provides support for a pair of wire baskets 264 and 266. Adjacent corner portions of the wire baskets 264 and 266 are positioned on the upper surface of the pedestal bracket's support plate 268. Retainer clip 260 is positioned over adjacent edges of the first and second wire baskets 264, 266 and a screw 262 is inserted through the aligned apertures within retainer clip and the pedestal bracket's support plate 268 and is tightened. Adjacent wires 264*a* and 266*a* of the first and second wire baskets 264, 266, respectively, are securely and fixedly maintained in position between the pedestal bracket's support plate 268 and retainer clip 260. Each retainer clip 260 is adapted for securely attaching either a single wire basket or a pair of wire baskets to pedestal bracket 256. Also shown in FIG. 30 is the lower plate 270 and an upper plate 272 of the vertical support member (not shown for simplicity) to which pedestal bracket 256 is attached.

As shown in FIG. 30, the positions of wires 264*a* and 266*a*, which are attached to pedestal bracket 256 by means of its retainer clip 260, may be variably positioned between the pedestal bracket's support plate 268 and its retainer clip in both the longitudinal and lateral directions. For example, wire 264*a* is disposed closer to the outer edge of retainer clip 260, while wire 266*a* is positioned closer to the center of retainer clip 260, and is almost in contact with the tab of the retainer clip through which the retainer clip screw 262 is inserted. By adjusting the positioning of wires 264*a* and 266*a* in the direction of arrow 274*a* or in the direction of arrow 274*b*, the spacing between the first and second wire baskets 264 and 266 may be adjusted longitudinally, as desired. The capability to adjust the spacing between adjacent wire baskets allows these pedestal brackets of the present invention to be used with the United States standard grid system of a 24 inch by 24 inch for the spacings of vertical supports 248 as well as the 600 mm by 600 mm grid spacing of the vertical supports for the Europe standard.

Figure 31:
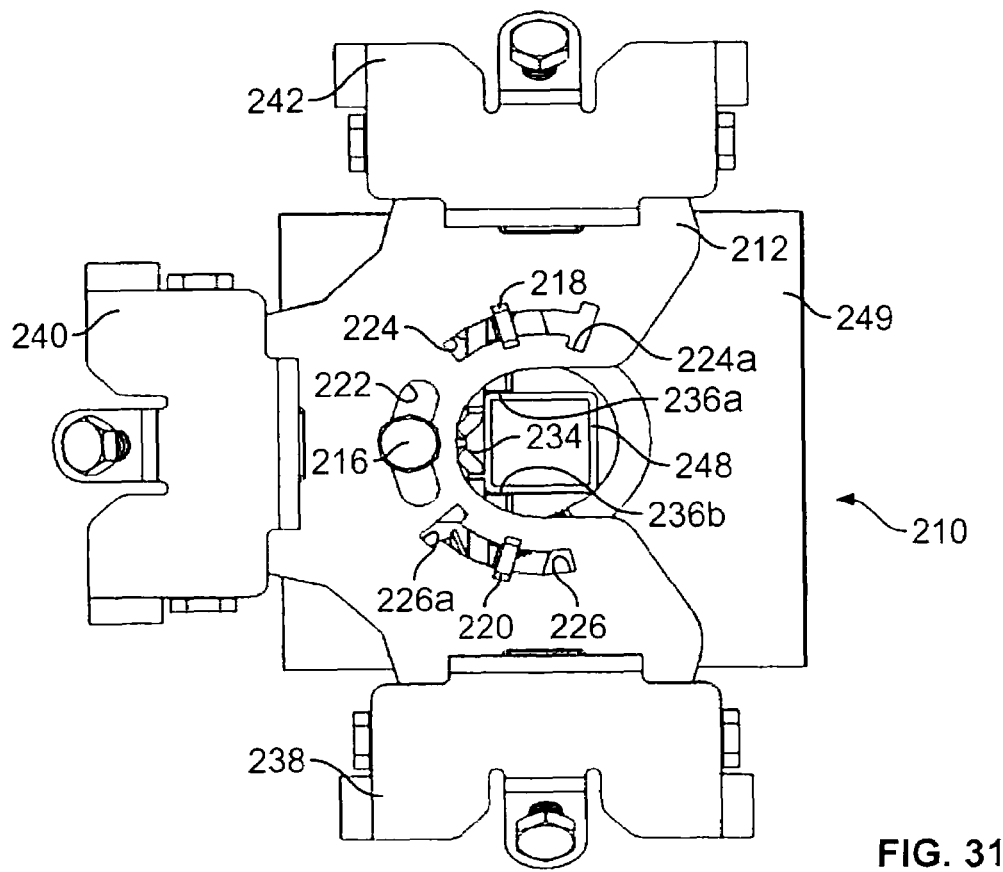
FIGS. 31-33 are top plan views of the inventive pedestal bracket illustrating the manner in which the angular orientation of the pedestal bracket on a vertical support member to which it is attached may be varied over a 360° range.
Figure 33:
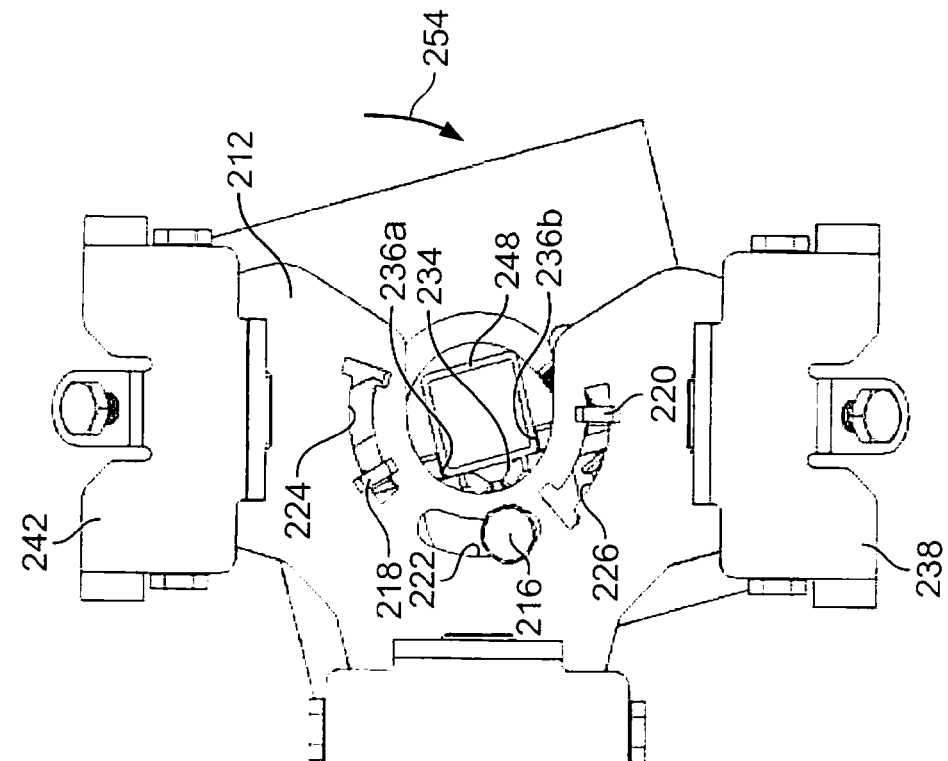
Figure 32:
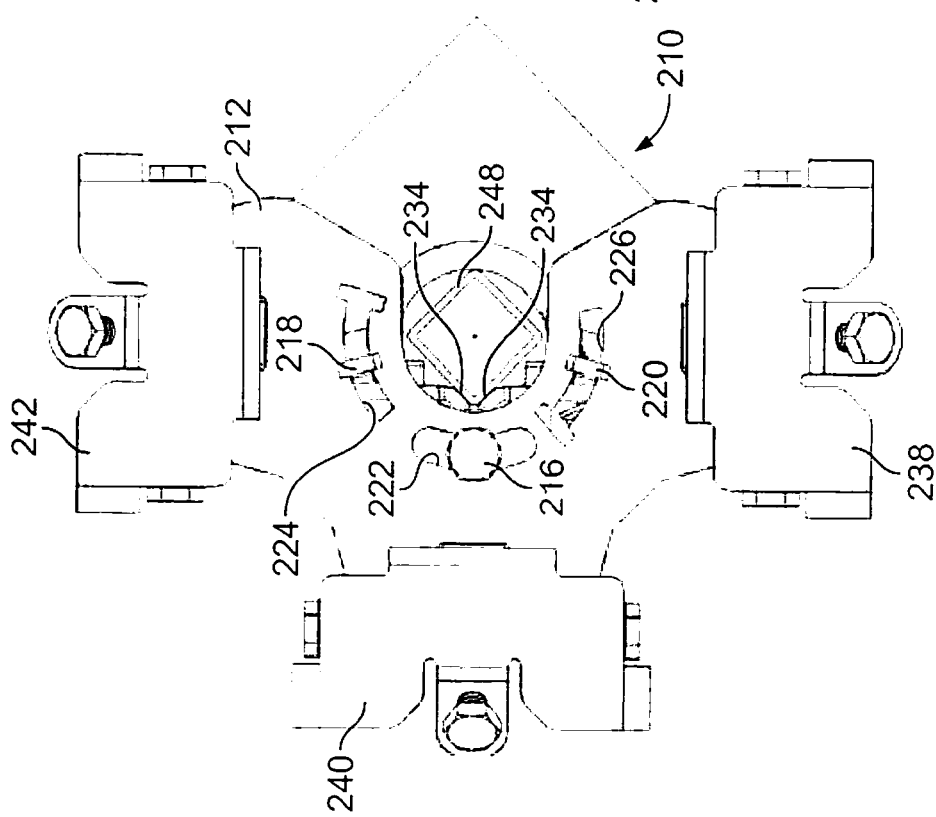

Referring to FIGS. 31-33, the manner in which the inventive pedestal bracket 210 may be positioned at any angular orientation on a generally square vertical support member 248 will now be described. As shown in FIG. 31, pedestal bracket 210 engages a pair of opposed lateral sides of vertical support member 248 between its opposed facing flat surfaces 236*a* and 236*b*. The orientation of pedestal bracket 210 relative to vertical support member 248 may be changed by rotating pedestal bracket 45° and inserting an outer corner of the vertical support member in the pedestal bracket's V-shaped, recess 234 as previously described and as shown in FIG. 32. Pedestal bracket 210 may be oriented at any angle between 0°, as shown in FIG. 31, and 45°, as shown in FIG. 32. In FIG. 33, the pedestal bracket 210 is also shown engaging opposed outer walls of vertical support member 248 between its first and second facing flat surfaces 236*a* and 236*b*. However, in FIG. 33, support plate locking screw 216 has been loosened, allowing support plate 212 to rotate relative to support clamp 214 in the direction of arrow 254. Changing the orientation of pedestal bracket 210 relative to the vertical support member 248 causes the support plate locking screw 216 to be positioned at the lower end of first curvilinear slot 222 in support plate 212 as shown in FIG. 33.

Similarly, the first and second shoulder locking tabs 218 and 220 have moved within the second and third curvilinear slots 224 and 226, respectively. Rotational displacement of the pedestal bracket 210 relative to the vertical support member 248 in the opposite direction would position the support plate locking screw 216 in an upper portion of the first curvilinear slot 222. Similarly, the first and second shoulder locking tabs 218, 220 would be moved to respective opposed ends of the second and third curvilinear slots 224 and 226 from that shown in FIG. 33. Once the support plate 212 is in the desired orientation relative to the vertical support member 248, the support plate locking screw 216 is tightened for securely and fixedly connecting the support plate 212 to the support clamp 214, with the pedestal bracket 210 similarly in fixed orientation relative to the vertical support member. Support plate 212 and support clamp 214 remain connected during relative rotational displacement between these two components by means of support plate locking screw 216 and shoulder locking tabs 218, 220. Support plate 212 is capable of undergoing up to 22½" rotational displacement relative to support clamp 214. Thus, any angular orientation between pedestal bracket 210 and vertical support member 248 may be achieved. For example, by attaching pedestal clamp 210 to the vertical support member 248, as shown in FIG. 31, with opposed sides of the vertical support member engaged by the pedestal clamp, the angle between the pedestal clamp and vertical support member may be changed by up to 22½" by rotating the pedestal bracket's plate 212 relative to its support clamp 214 in a first direction. Any angle between 22½" and 45" between the pedestal clamp 210 and vertical support member 248 may be achieved by positioning the pedestal bracket in engagement with two adjacent surfaces, or with a corner, of the vertical support member 248 and rotating the support clamp 212 relative to the vertical support member in a second, opposed direction.

Figure 34:
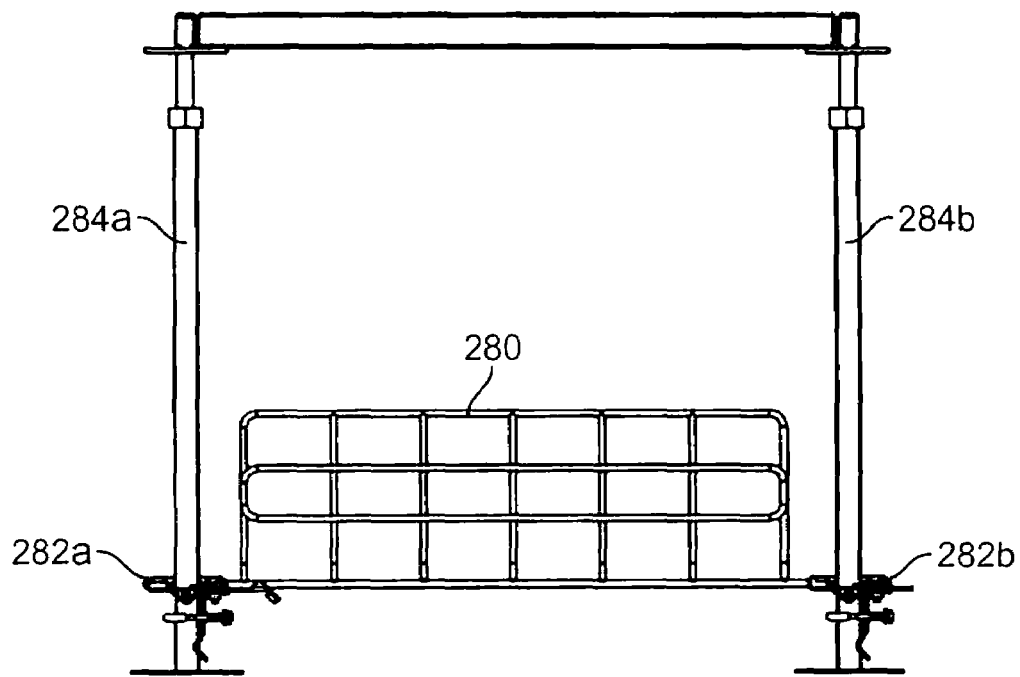
FIGS. 34-35 are side elevation views of a wire basket attached to a pair of vertical supports by means of a pair of pedestal brackets in accordance with the present invention, wherein the vertical position of the wire baskets may be varied in a continuous manner over a vertical height range.
Figure 35:
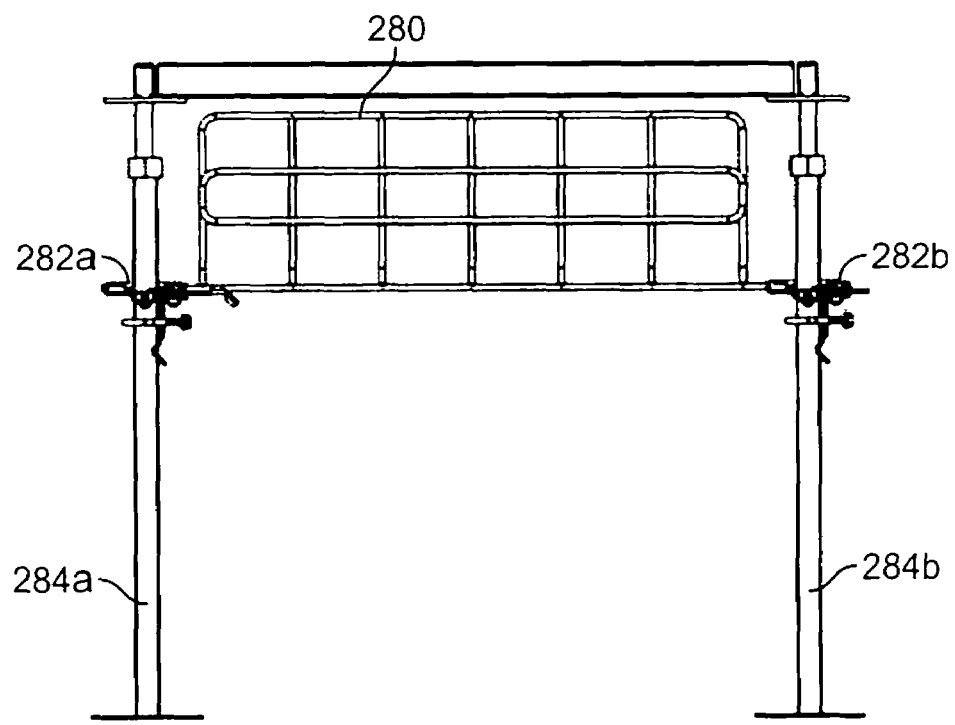

The inventive pedestal clamp 210 has a further benefit in that it is capable of universal height adjustment of a wire basket to which it is connected. U-bolt clamp 228 can be releasably secured to vertical support member 248 at any desired position along the length of vertical support member 248. For example, as shown in FIG. 34, wire basket 280 is connected to lower end portions of first and second vertical support members 284*a* and 284*b* by first and second pedestal brackets 282*a* and 282*b*, respectively. FIG. 35 shows the vertical wire basket 280 connected to upper portions of the first and second vertical support members 284*a* and 284*b* by the first and second pedestal brackets 282*a* and 282*b*, respectively. Thus, the pedestal brackets of the present invention are capable of securely and fixedly positioning a wire basket at any height along the length of the vertical support members of the wire basket support system.

Figure 36:
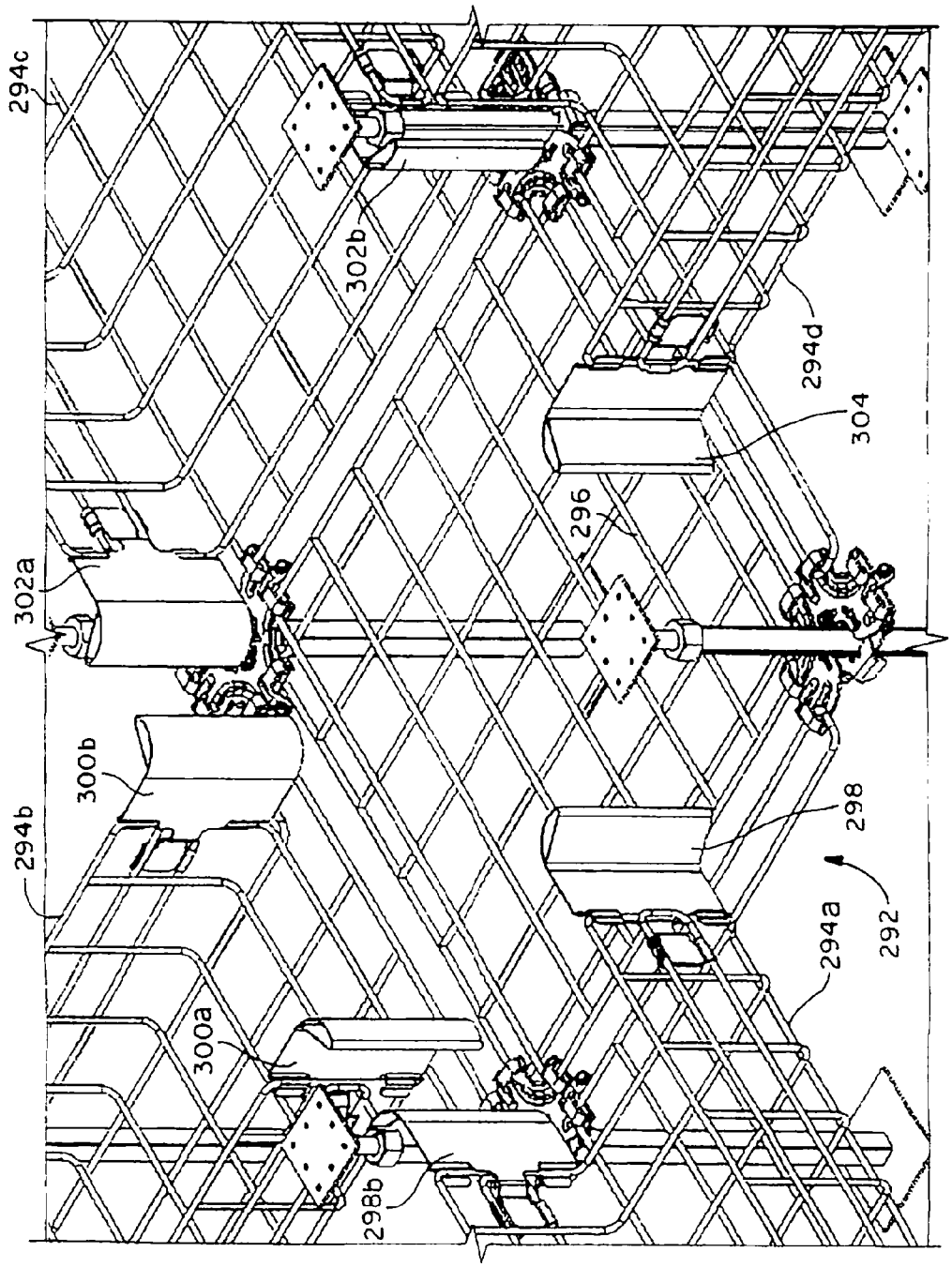
FIG. 36 is a perspective view of a portion of a wire basket pathway system incorporating plural cable bend guides in accordance with another aspect of the present invention.

Referring to FIG. 36, there is shown an upper perspective view of a wire basket pathway system 292 in accordance with the present invention. Wire basket pathway system 292 includes plural wire baskets 294*a*-294*d* connected together by use of a wire basket intersection 296. Plural cable bend guides are attached to the ends of the various wire baskets shown in FIG. 36 to accommodate a 90° turn in the cable runs. Thus, the first wire basket 294*a* has attached to its end adjacent to the wire basket intersection 296 first and second cable bend guides 298*a* and 298*b*. The second wire basket 294*b* has third and fourth cable bend guides 300*a* and 300*b* attached to its end which is adjacent to the wire basket intersection 296. The third wire basket 294*c* similarly has a pair of cable bend guides 302*a* and 302*b* connected to its end adjacent to the wire basket intersection 296. Finally, the fourth wire basket 294*d* has a cable bend guide 304 attached to its end adjacent to the wire basket intersection 296. The cable bend guides provide a smooth bend radius for the cables undergoing a 90° turn in passing from one wire basket to another, adjacent wire basket.

Figure 37:
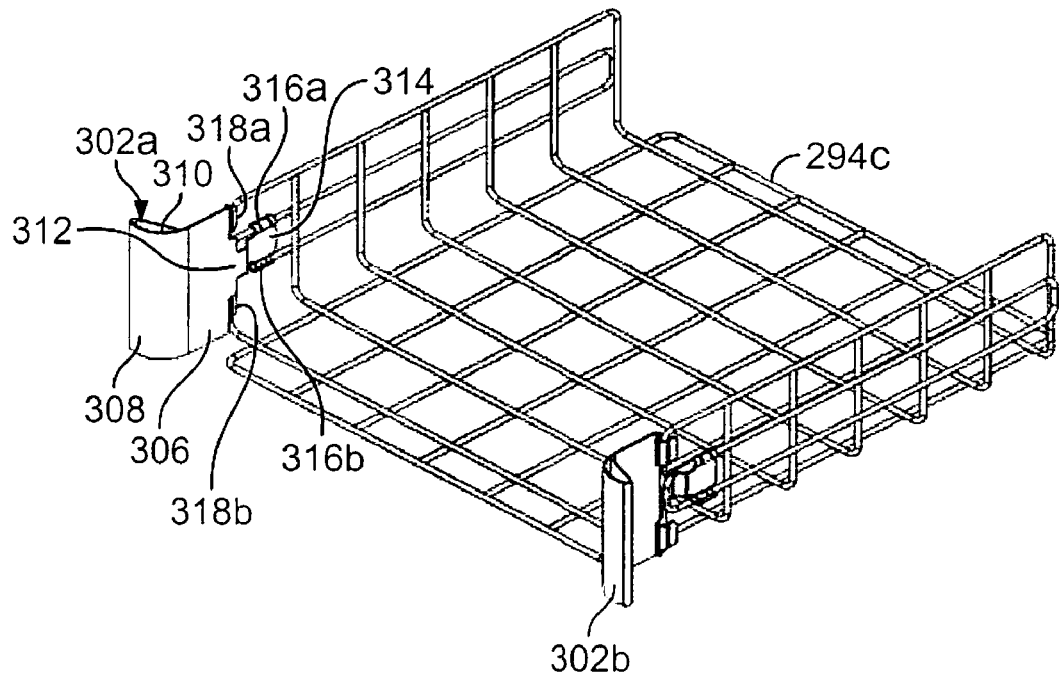
FIG. 37 is an upper perspective view of a wire basket to which are attached a pair of inventive cable bend guides.
Figure 38:
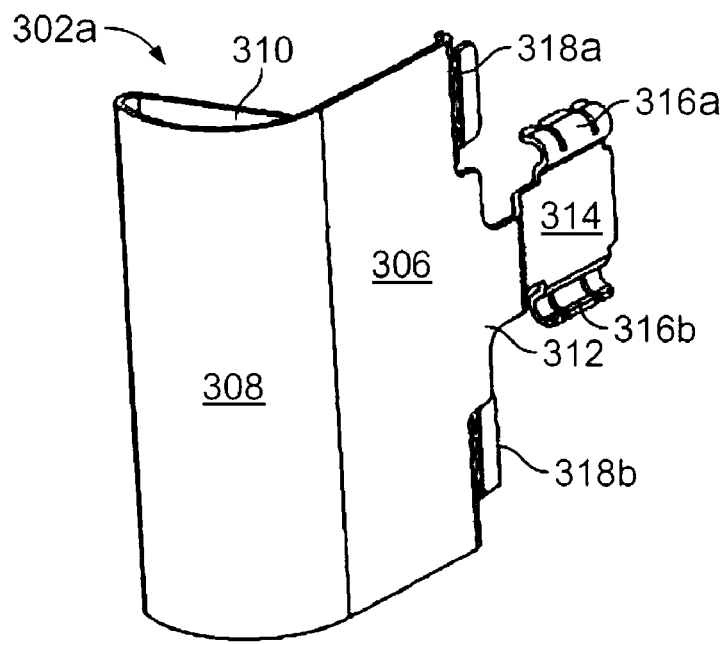
FIG. 38 is a perspective view of the inventive cable bend guide.

FIG. 37 is an upper perspective view of wire basket 294c illustrating additional details of cable bend guides 302a and 302b which will now be described in terms of FIGS. 38-42 which show the manner in which a cable bend guide is attached to a wire basket. Referring to FIG. 38, there is shown a perspective view of cable bend guide 302a. Cable bend guide 302a includes a first generally planar wall section 306, a second curvilinear wall section 308 and a third generally planar wall section 310. The three sections are formed from a single piece of high strength metal such as pre-galvanized sheetsteel. The curvilinear wall section 308 of the cable bend guide 302a engages one or more cables undergoing a turn in their routing for providing the cable, or cables, with a smooth bend radius. The third planar wall section 310 serves to reinforce, or strengthen, the cable bend guide 302a for use with large numbers of cables and eliminates any sharp edges which could damage the cables. Extending rearwardly from the first planar wall section 306 of the cable bend guide 302a is a tab 312 to which is attached a mounting clip 314. Mounting clip 314 includes upper wire hooks 316a and lower wire hooks 316b. Also extending from the aft edge of the cable bend guide's first planar wall section 306 are upper and lower retaining tabs 318a and 318b.

Figure 39:
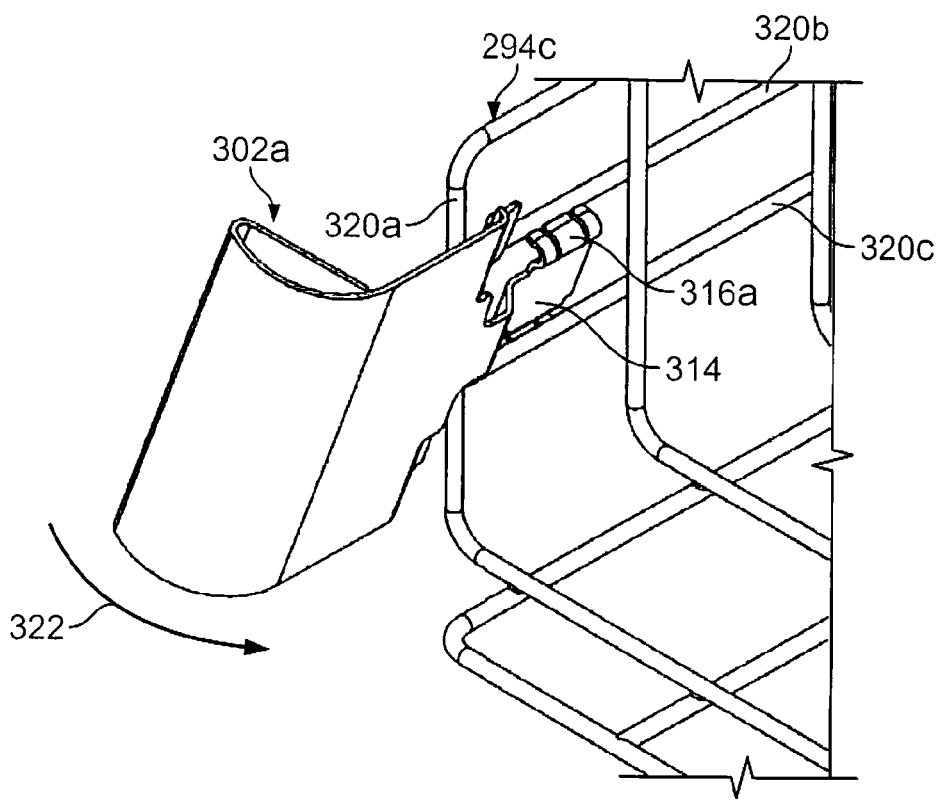
FIGS. 39-41 are perspective views illustrating the sequence of steps involved with attaching the inventive cable bend guide to a wire basket.
Figure 40:
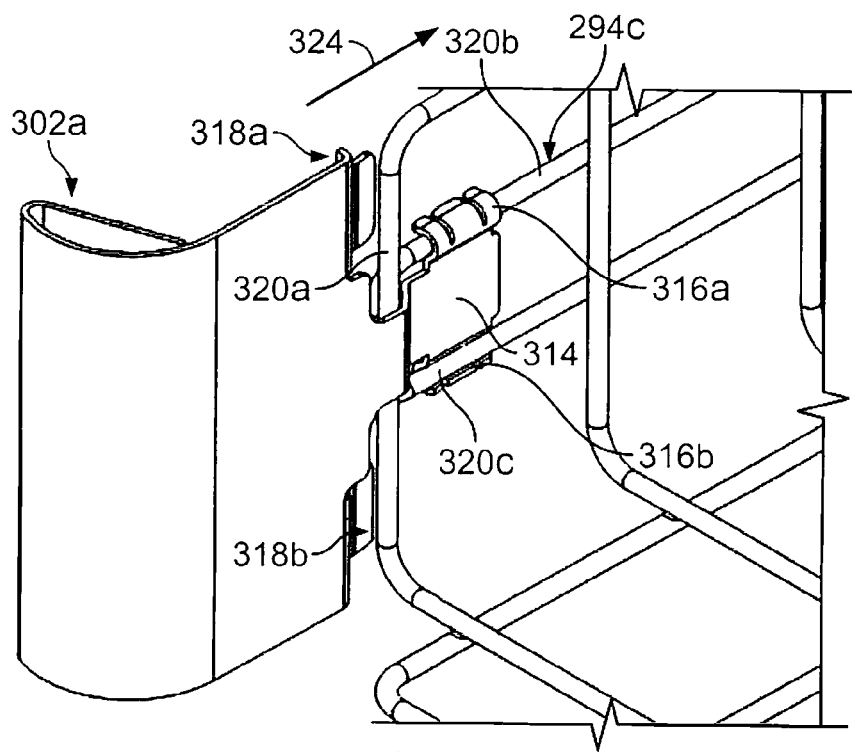
Figure 41:
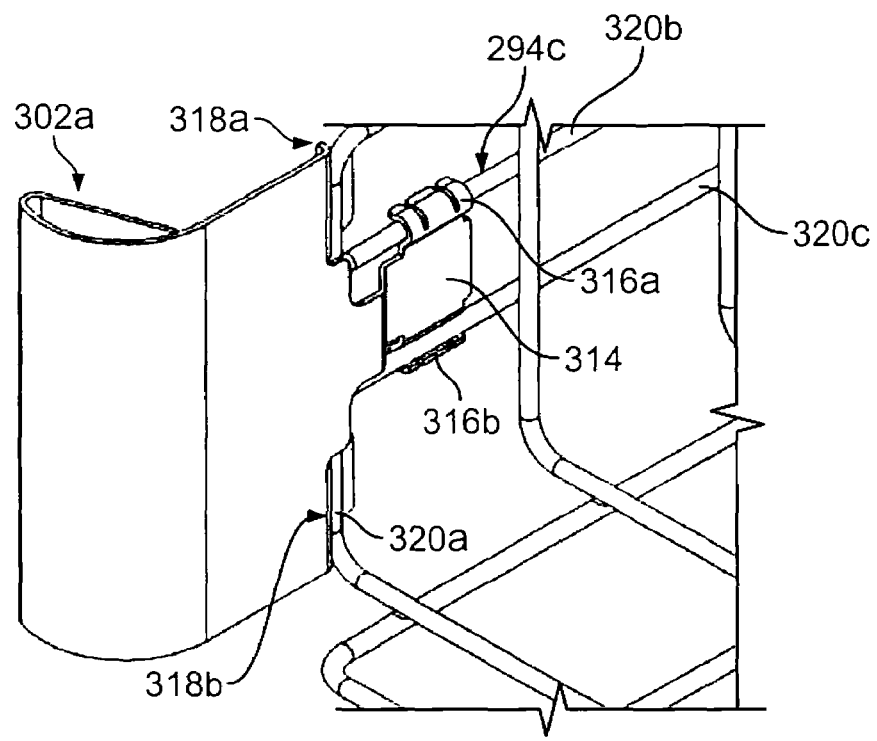
Figure 42:
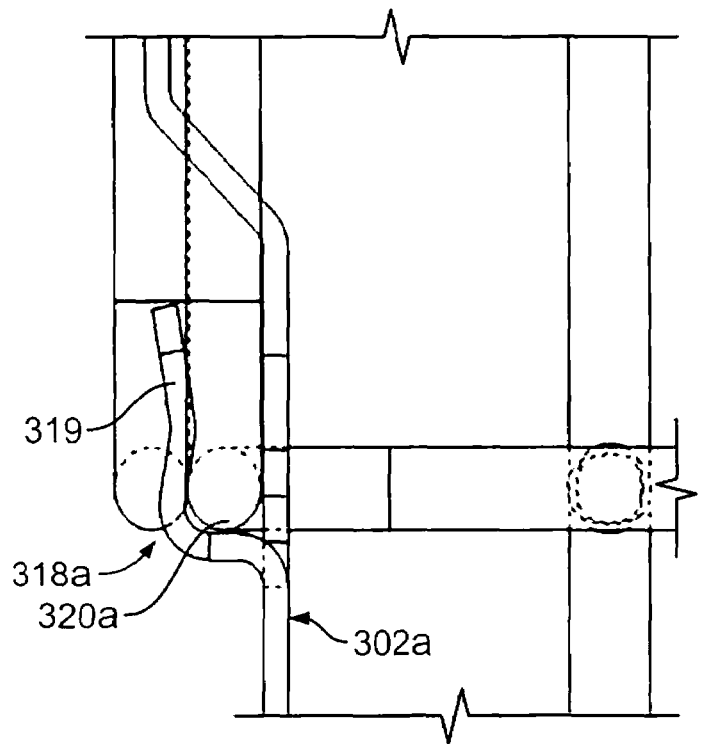
FIG. 42 is a sectional view of a portion of the inventive cable bend guide attached to a wire basket.

Cable bend guide 302a is attached to wire basket 294c in the following manner. Cable bend guide 302a is positioned inside of a first end wire 320a of the wire basket 294c, with its mounting clip 314 located between second and third wires 320b and 320c of the wire basket as shown in FIG. 39. In this position, the first upper wire hooks 316a are disposed on a first side of the second wire 320b, while the second lower wire hooks 316b are disposed on a second, opposed side of the third wire 320c. Cable bend guide 302a is then rotated in the direction of arrow 322 in a counter clockwise direction as viewed in FIG. 39. The first upper wire hooks 316a then engage the second wire 320b in a snap-acting manner, while the second lower wire hooks 316b engage the third wire 320c also in a snap-acting manner as shown in FIG. 40. The wire hooks are sized so as to securely engage a wire of wire basket 294c when pressure is applied by rotational displacement of the cable bend guide 302a, as described. The cable bend guide 302a is then linearly displaced in the direction of arrow 324 as shown in FIG. 40. This causes the first and second retaining tabs 318a and 318b to engage the wire basket's first wire 320a, also in a snap-acting manner, as shown in FIG. 41. Each of the retaining tabs includes an angled portion 319 as shown with the first retaining tab 318a in FIG. 42 which engages the first wire 320a and further attaches the cable bend guide 302a to wire basket 294c. With the first and second wire hooks 316a, 316b engaging opposed sides of the second and third wires 320b and 320c, and with each of the retaining tabs 318a and 318b engaging the wire basket's first wire 320a, cable bend guide 302a is securely attached in a fixed manner to wire basket 294c.

Though particular embodiments of the present invention have been shown and described, it will be obvious to those skilled in the relevant arts that changes and modifications may be made without departing from the invention in its broader aspects. Therefore, the aim of the appended claims is to cover all such changes and modifications as falls within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A support clamp assembly, comprising:
   a wall comprising a flat surface comprising a V-shaped recess therein;
   first and second tabs spaced apart from each other and extending from the flat surface, each tab comprising an inner surface in facing relation to one another and positioned to receive opposing walls of a vertical support member; and
   a clamp member movably connected to the wall such that the vertical support member can be confined between the wall and the clamp member.

2. The support clamp assembly of claim 1, wherein the V-shaped recess extends in a generally vertical direction for engaging an outer corner of the vertical support member and wherein the wall is positioned on both sides of the V-shaped recess.

3. The support clamp assembly of claim 2, wherein the V-shaped recess and the spaced apart tabs are positioned adjacent to one another and form an aperture defined in the wall wherein a width of the aperture defined at the V-shaped recess is smaller than the width of the aperture between the inner surfaces of the first and second tabs.

4. The support clamp assembly of claim 3, wherein the wall on both sides of the V-shaped recess is positioned to receive a wall of the vertical support member positioned between the opposing walls of the vertical support member with the opposing walls engaging the inner surfaces of the first and second tabs.

5. The support clamp assembly of claim 1, wherein the clamp member comprises a U-shaped bolt.

6. The support clamp assembly of claim 5, wherein the U-shaped bolt comprises a curvilinear end engaged within an aperture defined in the wall allowing the U-shaped bolt movement such that a first end of the U-shaped bolt is positionable within a notch defined in the wall spaced apart from the aperture.

7. The support clamp absently of claim 6, wherein a second end of the U-shaped bolt defines threads engageable by a nut with compatible threads.

8. A support clamp assembly, comprising: a wall comprising an aperture and a notch formed therein, the notch spaced apart from the aperture, wherein a surface of the wall disposed between the aperture mad the notch is adapted to engage a vertical support member; and a generally U-shaped clamp adapted to engage the support member, the U-shaped clamp comprising a curvilinear end portion and a threaded end portion, wherein the curvilinear end portion is inserted through the aperture and the threaded end portion is engagable with the notch to maintain the U-shaped clamp in secure engagement with the support member.

9. The support clamp assembly of claim 8, further comprising a V-shaped recess defined by the wall and positioned between the aperture and the notch.

10. The support clamp assembly of claim 9, further comprising first and second tabs spaced apart from each other and extending from the wall, each tab comprising an inner surface in facing relation to one another and positioned to receive opposing walls of the vertical support member.

11. The support clamp assembly of claim 10, wherein the V-shaped recess and the spaced apart tabs are positioned adjacent to one another and form an aperture wherein a width of the aperture defined at the V-shaped recess is smaller than the width of the aperture between the inner surfaces of the first and second tabs.

12. The support clamp assembly of claim 11, wherein the wall is positioned on both sides of the V-shaped recess and is positioned to receive a wall of the vertical support member positioned between the opposing walls of the vertical support member with the opposing walls engaging the inner surfaces of the first and second tabs.

13. The support clamp assembly of claim 8, further comprising a nut with compatible threads to the threaded end portion of the U-shaped bolt.

14. A pedestal bracket assembly, comprising:
a support clamp capable of engagement with a vertical support member in a fixed manner, wherein the support clamp comprises a U-shaped bolt moveably secured to a wall of the support clamp wherein the vertical support member is positionable between the U-shaped bolt and the wall; a support plate attached to the support clamp; and a plurality of retainer clips spaced apart from each other and releasably attached to the support plate.

15. The pedestal bracket assembly of claim 14, wherein a V-shaped recess is defined by the wall for receiving a corner of the vertical support member and wherein the wall is positioned on both sides of the V-shaped recess.

16. The pedestal bracket assembly of claim 15, further comprising first and second tabs spaced apart from one another and extending from the wall wherein each tab comprises an inner surface in facing relation to one another and positioned to receive opposing walls of the vertical support member.

17. The pedestal bracket assembly of claim 16, wherein the V-shaped recess and the spaced apart tabs are positioned adjacent to one another and form an aperture defined in the wall wherein a width of the aperture defined at the V-shaped recess is smaller than the width of the aperture between the inner surfaces of the first and second tabs.

18. The pedestal bracket assembly of claim 17, wherein the wall on both sides of the V-shaped recess is positioned to receive a wall of the vertical support member positioned between the opposing walls of the vertical support member with the opposing walls engaging the inner surfaces of the first and second tabs.

19. The pedestal bracket assembly of claim 14, wherein the support plate is secured to the support clamp with a locking screw.

20. The pedestal bracket assembly of claim 14, wherein each of the plurality of retainer clips comprises an angled tab for insertion into a slot defined by the support plate, wherein a retainer clip screw engages an opening defined in one of the retainer clips and a corresponding opening defined in the support plate, wherein as the screw is tightened the one of the retainer clips is urged toward the support plate such that a wire of a wire basket is securable between the one of the retainer clips and the support plate.

21. The pedestal bracket assembly of claim 14, wherein the plurality of retainer clips comprises three spaced apart from one another.

22. A pedestal bracket assembly, comprising: a support clamp capable of engagement with a vertical support member in a fixed manner, wherein the support clamp further comprises a U-shaped bolt moveably secured to a wall of the support clamp wherein the vertical support member is positionable between the U-shaped bolt and the wall; a support plate adapted for engagement with at least one wire basket, the support plate comprising an opening formed therein, tile opening being configured to receive the vertical support member; wherein the support plate is movably connected to the support clamp such that the support plate is rotatable about the vertical support member.

23. The pedestal bracket assembly of claim 22, wherein a V-shaped recess is defined by the wall for receiving a corner of the vertical support member wherein the wall is positioned on both sides of the V-shaped recess.

24. The pedestal bracket assembly of claim 23, further comprising first and second tabs spaced apart from one another and extending from the wall wherein each tab comprises an inner surface in facing relation to one another for receiving opposing walls of the vertical support member.

25. The pedestal bracket assembly of claim 24, wherein the V-shaped recess and the spaced apart tabs are positioned adjacent to one another and form an aperture defined in the wall wherein a width of the aperture defined at the V-shaped recess is smaller than the width of the aperture between the inner surfaces of the first and second tabs.

26. The pedestal bracket assembly of claim 25, wherein the wall on both sides of the V-shaped recess is positioned to receive a wall of the vertical support member positioned between the opposing walls of the vertical support member with the opposing walls engaging the inner surfaces of the first and second tabs.

27. The pedestal bracket assembly of claim 22, further comprising at least one retainer clip, wherein the at least one retainer clip comprises an angled tab for insertion into a slot defined by the support plate, wherein a retainer clip screw engages an opening defined in the at least one retainer clip and a corresponding opening defined in the support plate, wherein as the screw is tightened the at least one retainer clip is urged toward the support plate such that a wire of a wire basket is securable between the at least one retainer clip and the support plate.

28. The pedestal bracket assembly of claim 22, wherein the support clamp further comprises a first shoulder locking tab and the support plate defines a slot wherein the first shoulder locking tab engages the slot.

29. The pedestal bracket assembly of claim 28, wherein the slot is curvilinear in shape.

30. The pedestal bracket assembly of claim 29, wherein the support clamp comprises a second shoulder locking tab spaced apart from the first shoulder locking tab and the support plate defines another curvilinear slot spaced apart from the slot, wherein the first shoulder locking tab engages the curvilinear slot and the second shoulder locking tab engages the other curvilinear slot.

* * * * *